US010365297B2

(12) United States Patent
Bechhoefer

(10) Patent No.: US 10,365,297 B2
(45) Date of Patent: Jul. 30, 2019

(54) SYSTEM AND METHOD FOR GENERATION OF A TACHOMETER SIGNAL AND REDUCTION OF JITTER

(71) Applicant: Eric Robert Bechhoefer, Cornwall, VT (US)

(72) Inventor: Eric Robert Bechhoefer, Cornwall, VT (US)

(73) Assignee: Green Power Monitoring Systems, Inc., Cornwall, VT (US)

( * ) Notice: Subject to any disclaimer, the term of this patent is extended or adjusted under 35 U.S.C. 154(b) by 102 days.

(21) Appl. No.: 15/790,413

(22) Filed: Oct. 23, 2017

(65) Prior Publication Data
US 2018/0059135 A1 Mar. 1, 2018

Related U.S. Application Data

(63) Continuation-in-part of application No. 15/682,860, filed on Aug. 22, 2017, now Pat. No. 10,197,594, which is a continuation of application No. 15/293,188, filed on Oct. 13, 2016, now Pat. No. 9,778,281.

(60) Provisional application No. 62/241,186, filed on Oct. 14, 2015.

(51) Int. Cl.
G01P 21/02 (2006.01)
G01M 1/16 (2006.01)
(52) U.S. Cl.
CPC .............. *G01P 21/02* (2013.01); *G01M 1/16* (2013.01)

(58) Field of Classification Search
CPC combination set(s) only.
See application file for complete search history.

(56) References Cited

U.S. PATENT DOCUMENTS

2014/0067289 A1* 3/2014 Baldwin ................ G01H 1/003
702/56
2018/0059135 A1* 3/2018 Bechhoefer ............. G01P 21/02

OTHER PUBLICATIONS

Bechhoefer, et al., "Initial Condition Monitoring Experience on a Wind Turbine", Annual Conference of the Prognostics and Health Management Society, dated 2012.
Bechhoefer, et al., "Processing for Improved Spectral Analysis", Annual Conference of the Prognostics and Health Management Society, dated 2013.

(Continued)

*Primary Examiner* — Jewel V Dowtin
(74) *Attorney, Agent, or Firm* — Justin McCabe, Esq.; Dunkiel Saunders Elliott Raubvogel & Hand PLLC

(57) ABSTRACT

A system and method for generating a tachometer signal from a vibration sensor is disclosed in which an approximately idealized band pass filter is used along with a fast Fourier transform (FFT) to create a sufficient analytic signal to derive the tachometer signal for a shaft or other rotating component. In addition, jitter in the generated tachometer signal, or any tachometer signal, can be reduced by using an approximately idealized low pass filter and then transforming the filtered signal using a real FFT. These processes can be performed using a smart vibration sensor, which facilitates improved vibration analysis on rotating equipment where in the past the addition of a tachometer would be prohibitive due to cost, weight, certification requirements, or physical impracticality.

20 Claims, 18 Drawing Sheets

(56) References Cited

OTHER PUBLICATIONS

Bechhoefer, et al., "Signal Processing Techniques to Improve an Acoustic Emissions Sensor", Annual Conference of the Prognostics and Health Management Society, dated 2013.
Bonnardot, et al., "Use of the acceleration signal of a gearbox in order to perform angular resampling (with limited speed fluctuations)", Mechanical Systems and Signal Processing 19, dated 2005, pp. 766-785.
Combet, et al., "An automated methodology for performing time synchronous averaging of a gearbox signal without speed sensor", Mechanical Systems and Signal Processing 21, dated 2007, pp. 2590-2606.
Lebold, et al., "Review of Vibration Analysis Methods for Gearbox Diagnostics and Prognostics", Proceedings of the 54th Meeting of the Society for Machinery Failure Prevention Technology, dated 2000.
Mcfadden, et al., "A revised model for the extraction of periodic waveforms by time domain averaging", Mechanical Systems and Signal Processing 1 (1), 83-95, 1987, dated 1987.
Zakrajsek, et al., "An Analysis of Gear Fault Detection Methods as Applied to Pitting Fatigue Failure Data", NASA Technical Memorandum 105950, dated 1993.

\* cited by examiner

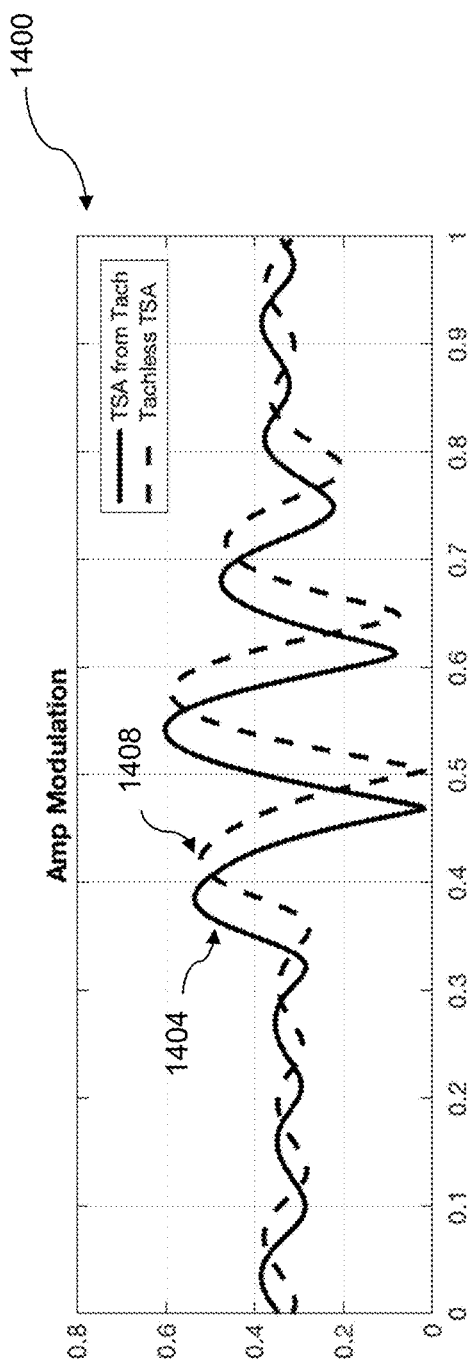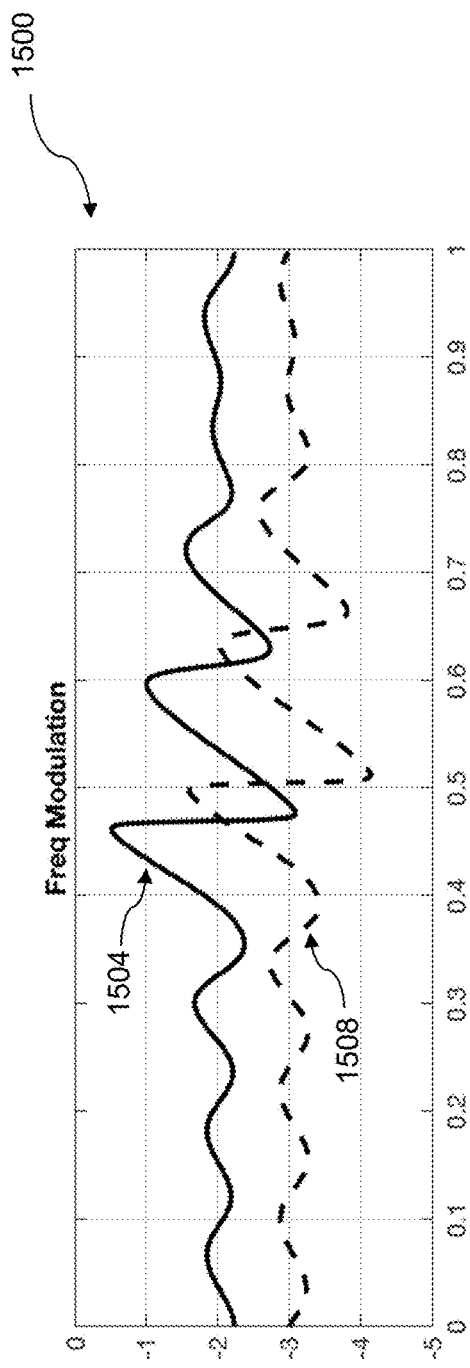
FIG. 15A
FIG. 15B

SYSTEM AND METHOD FOR GENERATION OF A TACHOMETER SIGNAL AND REDUCTION OF JITTER

CROSS-REFERENCE TO RELATED APPLICATIONS

This application is a continuation-in-part of U.S. application Ser. No. 15/682,860, filed Aug. 22, 2017 and titled "Tachometer Signal Jitter Reduction System and Method," which claims priority to U.S. application Ser. No. 15/293,188, filed Oct. 13, 2015 and titled "Tachometer Signal Jitter Reduction System and Method," which claimed priority to U.S. Provisional Patent Application. No. 62/241,186, filed Oct. 14, 2013 and titled "Tachometer Signal Jitter Reduction System and Method," all of which are hereby incorporated by reference in their entireties.

FIELD OF INVENTION

The present invention generally relates to rotating equipment condition monitoring. In particular, the present invention is directed to a system and method for the generation of a tachometer signal based on information from a vibration sensor and for the reduction of jitter in that signal.

BACKGROUND OF THE INVENTION

Diagnostics of rotating components are a maturing field and the tachometer plays an important role in the quality of vibration based diagnostics. Various studies have disclosed a number of analysis techniques, such as synchronous analyses (primarily for shafts and gears) and non-synchronous analyses (primarily for bearings). Synchronous analyses are typically based on the time synchronous average so as to eliminate signal components that are not synchronous with the rate of rotation of the shaft or gear, whereas non-synchronous analysis generally uses some type of demodulation and enveloping, returning energy associated with the fault frequency of the item under analysis (e.g., bearing).

Synchronous analyses of vibration signals relating to rotating equipment have used the Fourier transform or the Fast Fourier transform (FFT) (the latter being more typically employed for processing efficiencies) to provide vibration based diagnostics by measuring the magnitude and phase of vibration of components under observation (such as shafts, gears or bearings), which can be indicative of wear and failure. When using the FFT, typically one assumes that the signal under analysis is infinite in time; however, this assumption fails for real signals and a common mitigation technique is the use of a window function, such as a Hamming window (general form:

$$w(n) = \alpha - \beta\cos\left(\frac{2\pi n}{N-1}\right)$$

or a Hanning window.

Another common assumption is that the vibration signal is stationary; however, as all rotating machines vary in their rotational rate due to changing load conditions and the limits of the feedback control bandwidth, this assumption of stationarity also commonly fails. In practice, the lack of stationarity results in "spectral smearing" of energy associated with a shaft, which in turn results in inaccurate measuring of the energy associated with a particular fault frequency. To improve the performance of vibration analysis using the FFT, Time Synchronous Averaging (the TSA, for shaft/gear analysis) and Time Synchronous Resampling (TSR) have been developed. Examples of TSA and TSR systems are shown in FIG. 1.

At a high level, the TSA resamples the vibration associated with a shaft or gear in the spatial domain such that vibration associated with each shaft order in the Fourier domain represents one frequency bin. For example, the gear mesh energy of a 37-tooth gear on a given shaft is found in the Fourier domain to be bin 38, and the second harmonic of that gear would be in bin 75 (37×2+1, (bin 1 is the DC energy)). The TSA also reduces non-synchronous vibration by $1/\sqrt{(rev)}$, where rev is the total number of shaft revolutions that constructed the TSA.

The TSR resamples (e.g., upsamples) the vibration to correct for variation in shaft speed. The apparent sample rate is the ratio of the total resampled time domain, i.e., vibration data set length divided by original data set length, multiplied by the original sample rate. For example, consider a system in which the shaft rate is such that for a given vibration sample rate, the acquisition system on average collects 800 samples per revolution. The TSR would resample the 800 samples to 1024 data points. (The value 1024 is the closest radix-2 value that is not less than 800. Radix-2 values are typically used because the simplest implementation of the FFT is based on powers of 2, i.e., radix-2 values.) If the load on the shaft decreases, the rotation rate of the shaft will increase, and the measured vibration will result in only 780 samples. Since it takes less time for the shaft to make one revolution, the number of samples will be fewer. The 780 samples are resampled to 1024 points by the TSR. If, on the other hand, the load on the shaft increases, slowing the shaft, the number of measured samples may increase to 820 samples, for example. Once again, the TSR will resample this data to 1024 points. For every revolution of the shaft, the resampled data is summed point by point. After n revolutions, each of the 1024 points of resampled vibration data is divided by n, essentially time synchronously averaging the vibration data.

TSA and TSR typically use a tachometer signal to calculate the time over which a shaft completes one revolution. As is generally known, the time taken for any shaft to complete a rotation can be calculated even if the tachometer is not associated with a given shaft. This can be calculated, for example, by taking into account the shaft ratio between the shaft with a tachometer to the shaft under analysis, then interpolating based on the known tachometer signal.

In implementation, the tachometer signal is the rising edge of a voltage trigger from the passing of a shaft key phasor (e.g. a stationary point of the shaft). The tachometer signal is then converted to time. This time is accrued for each pass of the key phasor. In an architecture where the tachometer signal is recorded using an analog to digital converter (ADC), the resolution in time of the rising edge is 1 over the sample rate of the ADC. For condition monitoring purposes, the sample rate for a high-speed shaft would be 100,000 samples per second. In another architecture, the tachometer signal inputs into a voltage comparator. When the tachometer signal crosses zero (or some low voltage offset), the comparator voltage goes high. The output of the comparator is monitored by the microcontroller using a general purpose input/output (GPIO) pin. When the microcontroller senses the GPIO pin going high, it records the time. The resolution of time on the microcontroller is typically much higher than an ADC. For example, in a system using a 12 MHz clock, the microcontroller might run at 96 MHz, but the counter for time in the microcontroller would run at 48 MHz. The tachometer resolution in time would then be 2.0822e-8 seconds.

The type of tachometer signal is dependent on the sensor type. Types of sensors typically used include, but are not limited to: 1) a Hall sensor, where there is a rising voltage associated with the passing of a ferrous target (such as a gear tooth) in front of the sensor; 2) an inductive sensor, where there is a rising voltage associated with the passing of any metallic target (such as an aluminum shaft coupling); 3) an optical sensor, where there is a rising voltage associated with the receiving of light from a reflective target on the shaft; or 4) a generator or variable reluctance sensor, where the frequency and amplitude of a sinusoidal signal is proportional to target (usually a gear) RPM, and the time of the zero crossing is taken at the transition of the sinusoid from negative to positive voltage.

In many instances, however, installation and/or use of these types of tachometer sensors may be impractical or undesirable. For example, there may be cases, such as glandless pumps, where due to heat and pressure it is impractical or infeasible to install a tachometer sensor. In other situations, such as monitoring gas turbine engines, interfacing with the existing tachometer for the power turbine or compressor turbine may change certification requirements (adding cost) or increase system cost and weight.

Therefore, there is a need to obtain information associated with tachometer signals in circumstances that prevent the use of a tachometer sensor or when interfacing with a tachometer sensor is difficult or impractical. This can be accomplished as disclosed herein through the use of smart sensors that can acquire vibration data associated with a rotating shaft, extract the shaft speed from the vibration data, and then process the data. This allows for an improved fault detection capability at a lower cost, a lower weight, and a reduced installation complexity compared to previously available techniques. Reducing cost, weight, and installation complexity will provide for the expanded application of condition monitoring, which would improve safety and reliability in industrial and transportation systems.

Spectral content of vibration, which can be used to monitor rotating components, can be abstracted from measured signals using the Fast Fourier Transform (FFT). The FFT is used in vibration based diagnostics to determine the magnitude and phase of the vibration of components (such as shafts, gears, or bearings), which can be indicative or wear and failure. Additionally, many common vibration analyses, such as residual analysis, difference analysis, or narrowband analysis, use the FFT for ideal filtering of the signal or to perform a Hilbert transform of the signal (i.e., Amplitude and Frequency Analysis).

Regardless of how vibration data is acquired, an incorrect tachometer signal reduces the effectiveness of the TSA and TSR to reduce spectral smearing, which negatively affects the ability of the vibration analysis to detect component faults. While important to all frequency signatures, the impacts are more apparent to higher frequency signatures and higher harmonics, which are often present when a component has a fault. Therefore, the techniques disclosed herein for reducing jitter in tachometer signals can improve the ability to monitor components and detect faults.

SUMMARY OF THE DISCLOSURE

In an exemplary aspect, a method of generating a tachometer signal and reducing jitter is provided that includes receiving vibration data from a vibration sensor monitoring a rotating component, applying a band pass filter to the vibration data, taking a fast Fourier transform of the filtered vibration data, producing a tachometer signal from the transformed, filtered vibration data, applying a low band pass filter to the tachometer signal, taking a fast Fourier transform of the filtered tachometer signal, and reconstructing a tachometer signal with reduced jitter from the transformed, filtered tachometer signal.

In another exemplary aspect, a system of generating a tachometer signal includes a vibration sensor that produces a vibration signal representative of a spectral content of vibration of a rotating component, where the vibration signal includes n data points, and a controller that receives the signal from the sensor, wherein the controller generates a tachometer signal from the vibration signal by determining a low bandwidth cutoff and a high bandwidth cutoff based on a gear mesh frequency, calculating a radix-2 length that is a closest larger value to n, zero padding the vibration data from n to the radix-2 length, taking a fast Fourier transform of the zero padded vibration data, zeroing the vibration data for which the fast Fourier transform was taken from zero to the low bandwidth cutoff and from the high bandwidth cutoff to the radix-2 length, taking an inverse fast Fourier transform of the zeroed, transformed vibration data, and normalizing the inverse transformed vibration data to produce a tachometer signal.

In another exemplary aspect, a method of reducing jitter in a tachometer signal is provided that includes receiving a tachometer signal, applying a low band pass filter to the tachometer signal, taking a fast Fourier transform of the filtered tachometer signal and reconstructing a tachometer signal with reduced jitter from the transformed, filtered tachometer signal.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 15A is a graph comparing differences in amplitude modulation for a gear analysis for a TSA from a tachometer and a TSA from a vibration sensor generated signal for which a phase error has not been corrected;

FIG. 15B is a graph comparing differences in frequency modulation for a gear analysis for a TSA from a tachometer and a TSA from a vibration sensor generated signal for which a phase error has not been corrected;

DESCRIPTION OF THE DISCLOSURE

A system and method for the generation of a tachometer signal from vibration sensor data according to the present disclosure allows for component monitoring and fault detection in situations in which use of prior art tachometer sensors are difficult or impractical to use. The tachometer signal is generated from vibration sensor data using a band pass filter with complex FFT. In addition, regardless of the source of a tachometer signal, tachometer signal jitter reduction systems according to the present disclosure enhance the performance of condition monitoring systems where accurate tachometer signals are needed. These systems are designed and configured to have a low order of operation so as to allow for implementation on low cost microcontrollers, which can be important for bused, distributed monitoring systems, in which the tachometer zero crossing data is collected and then broadcast to other remote sensors needing that information for vibration or other advanced analysis. Moreover, for monolithic architecture systems (e.g., a centralized processing and control architecture), the low order of operation and small software code base allows the system to be a simple/low cost addition to existing monitoring systems. In one alternative, a tachometer signal jitter reduction system uses a forward/backward infinite impulse response (IIR) filter to reduce noise (jitter) above the bandwidth of a shaft rate of change. In another alternative, another tachometer signal jitter reduction system uses a low pass filter with FFT to remove jitter.

Reducing Jitter: Forward/Backward IIR Filter

Advantageously, for systems that employ advanced vibration diagnostics using TSA or TSR, a jitter reduction system embodiment as disclosed herein has zero phase lag such that the system does not impact any analysis which needs phase information, such as shaft/rotor balancing. In exemplary embodiments, the system provides tachometer jitter reduction and analyses with a corresponding improvement in fault discrimination and separability. In one example, about a 26% increase in separability (the normalized statistical distance between a nominal and damage component) was observed on a real world fault. Moreover, uses of the system that improve separability can lead to earlier fault detection for a given probability of false alarm.

Figure 1:
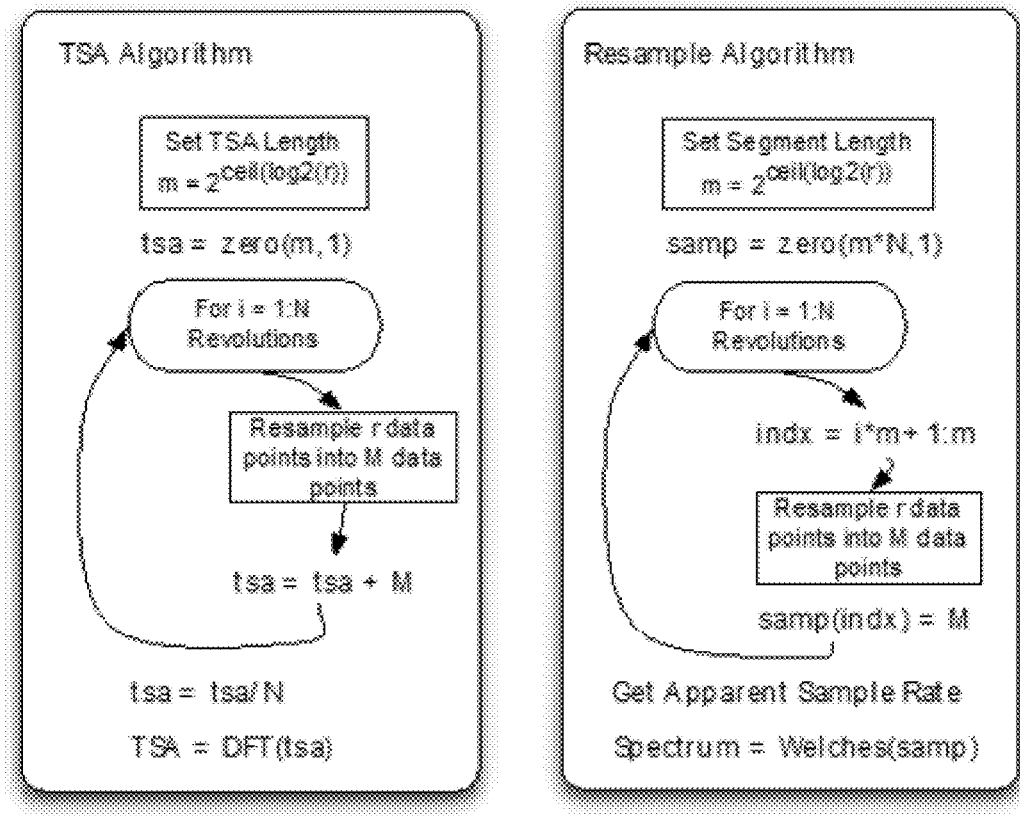
FIG. 1 are diagrams of exemplary prior art TSA and TSR techniques.
Figure 2:
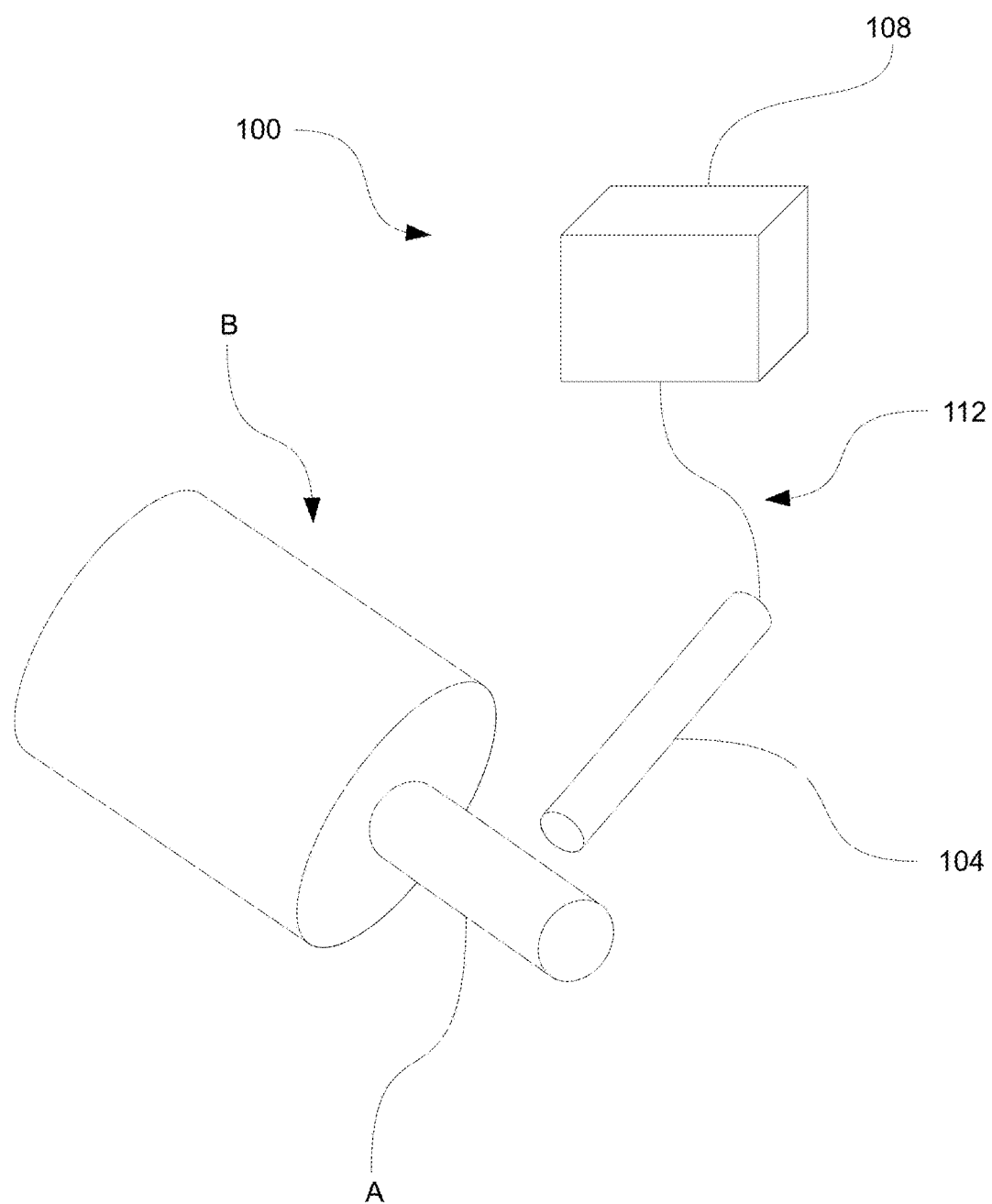
FIG. 2 is a block diagram of a tachometer signal jitter reduction system according to an embodiment of the present invention.

At a high level, and as shown in FIG. 2, a forward/backward jitter reduction system 100 includes a tachometer sensor 104 in electronic communication with a controller 108 via a communication link 112 (which may be a wired or wireless connection). Tachometer sensor 104 monitors the shaft speed of a rotating shaft, A (shown in FIG. 2 as the shaft of a motor, B). Controller 108 includes, among other things, a processor and a storage unit (not shown), and uses various techniques (discussed in more detail below) to remove jitter from the resulting signal received from tachometer sensor 104.

Tachometer sensor 104 can be, but is not limited to: 1) a Hall sensor, where there is a rising voltage associated with the passing of a ferrous target (such as a gear tooth) in front of the sensor; 2) an inductive sensor, where there is a rising voltage associated with the passing of any metallic target (such as an aluminum shaft coupling); 3) an optical sensor, where there is a rising voltage associated with the receiving of light from a reflective target on the shaft; or 4) a generator or variable reluctance sensor, where the frequency and amplitude of a sinusoidal signal is proportional to a target (usually a gear) RPM, and the time of the zero crossing is taken at the transition of the sinusoid from negative to positive voltage.

Before discussing an exemplary method of operating system 100, a general overview of vibration monitoring is presented. In general, vibration signals can be analyzed using amplitude and phase as a function of frequency. In conducting these analyses, understanding the tachometer phase is important for vibration monitoring as this information can highlight synchronous signals associated with a fault/imbalance condition of the component under observation and thus provide information to the operator or maintenance personnel about the state of components.

A model for vibration in a shaft in a gear box can be as shown in Equation 1:

$$x(t)=\Sigma_{i=1}^{k}X_i(1+a_i(t))\cos(2\pi i f_m(t)+\Phi_i)+b(t) \quad (\text{Eq. 1})$$

Where:
$X_i$ is the amplitude of the kth mesh harmonic;
$f_m(t)$ is the average mesh frequency;
$a_i(t)$ is the amplitude modulation function of the kth mesh harmonic;
$\Phi_i$ is the initial phase of harmonic k; and
$b(t)$ is additive background noise.
The mesh frequency is a function of the shaft rotational speed: $f_m=Nf$, where N is the number of teeth on the gear and f is the shaft speed. The vibration model of Equation 1 (above) assumes that f is constant. However, because of bandwidth limitations in the feedback control and time varying loads, there is some wander in the shaft speed f. As a result of the changes in shaft speed, there is smearing of amplitude energy in the frequency domain (the "smearing effect"). This smearing effect, and concomitantly, non-synchronous noise, is typically reduced by resampling the time domain signal into the angular domain as shown in Equation 2:

$$m_x(\theta)=E[x(\theta)]=m_x(\theta+\Phi) \quad \text{(Eq. 2)}$$

The variable $\Phi$ is the period of the cycle of the shaft under analysis, and is referenced by the tachometer sensor 104's zero crossing time. If the tachometer signal from tachometer sensor 104 is the true reference, the $m_x(\theta)$ is stationary and ergodic. Further, the non-synchronous noise is reduced by $1/\sqrt{rev}$, where rev is the number of cycles measured for the Time Synchronous Averaging (TSA).

However, an incorrect tachometer signal from tachometer sensor 104 will reduce the effectiveness of the TSA. An error in the tachometer signal, such as jitter, causes an error in $\Phi$, which (especially for large N (e.g. gear mesh)) causes the TSA to be non-ergodic and can negatively affect the ability of component monitoring systems to detect component faults.

Figure 3:
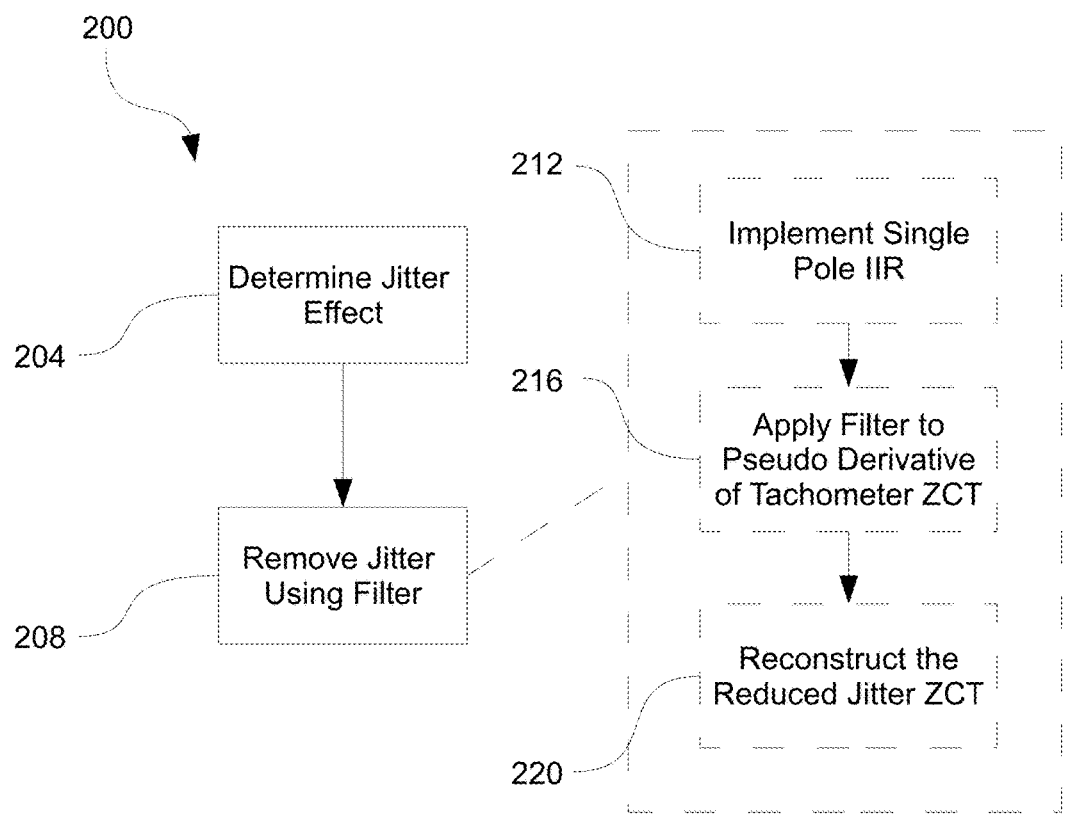
FIG. 3 is a process diagram of a process of reducing tachometer signal jitter according to an embodiment of the present invention.

Controller 108 can use a jitter removal process, such as jitter removal process 200 shown in FIG. 3, so as to determine the amount of jitter and to remove the jitter for subsequent analyses. The jitter can be determined at step 204 using the tachometer signal's zero crossing time (ZCT). (Note that regardless of the tachometer signal type (discussed above), the tachometer signal is used to calculate zero crossing times.) Generally, the output of a tachometer, such as tachometer sensor 104, is a zero crossing time (ZCT), for each tooth/target. The shaft rate is the inverse derivative of the ZCT. In application, the effect of jitter on the measured zero crossing time is inversely proportional to the derivative of the zero crossing time (dZCT) and the pulses per revolution (ppr) as shown in Equation 3 (below). Accordingly, if jitter is assumed to be a zero mean Gaussian process with some standard deviation, a, then the variance in shaft rate will be proportional to $\sqrt{2}\sigma$ (this because the shaft rate is a derivative, e.g., the difference in two ZCT).

$$\text{shaft rate}=1/\text{dZCT}/\text{PPR} \quad \text{(Eq. 3)}$$

For the purposes of obtaining jitter effect, the variance in the jitter is added. For example, if one assumes that there is an 8 pulse per revolution (ppr) target on a 30 Hz shaft, the ZCT time between each pulse is nominally 0.0042 seconds. Thus, the jitter in the tachometer signal, due to errors in manufacturing and electoral noise, is about 0.0001 seconds, which translates into a standard deviation of the shaft rate of about 0.14 Hz. Accordingly, for one revolution of the component under observation, the phase jitter is: $2\pi \times 0.14/30$ Hz or about 0.029 radians per revolution. For a 32-tooth gear, the phase error, per revolution, would be 0.94 radians.

To put exemplary numbers to this problem, for a sample rate of 97656 samples per second, the length of the TSA is: $2^{ceil(97656/30)}=4096$ points. This means that for a soft/broken tooth, in which the impact should be in a given bin, the jitter affects that bin index by +/−19 bins or about 68% of the time. Hence, without jitter removal, the TSA has become much less effective and all subsequent analysis is substantially flawed.

At step 208, the jitter is removed using a filtering technique suitable for the application and system. However, typically assessing and removing the jitter from the tachometer signal is necessarily done quickly so as to be useful for real time processing on a health and usage monitoring systems (HUMS), which generally precludes the use of traditional filtering techniques that unsuccessfully address phase discontinuity or lag associated with the filtered tachometer signal and take too long computationally. For example, traditional Finite Impulse Response (FIR) filters have an order of operation of $n^2$, and a phase delay of n/2, where n is the number of filter coefficients. For a filter with a normalized passband of 0.05 and a stopband of 0.1, an FIR filter would have an order of 101, whereas an equivalent Infinite Impulse Response (IIR) filter would have an order of 15. For an application, the FIR filter order of operations is 10,201 vs. the IIR filter order of operation of 225—in other words, the IIR is 45 times faster. Thus, for certain applications, such as embedded real time systems, the FIR filter requires too much computation to be of much use.

In an exemplary embodiment, process 200 uses an Infinite Impulse Response (IIR) filter to remove jitter from the tachometer signal. In general, this class of filter requires far fewer coefficients to achieve a given bandwidth when compared to the FIR filter (as noted above). While the phase of the IIR filter is non-linear, by running the filter forward and then backward in time, the phase cancels (e.g., it is a zero phase filter), with the benefit of improving the noise rejection/jitter of the tachometer signal.

The IIR filter is described in Equation 4 as a linear polynomial:

$$a[1]*Y[i]+a[2]Y[i-1]+\ldots+a[n+1]Y[n]=b[1]X[i]+b[2]X[i-1]+\ldots+b[m+1]X[m] \quad \text{(Eq. 4)}$$

Where:
  a are the feedback filter coefficients;
  n is the feedback filter order;
  Y is the output signal;
  b are the feedforward filter coefficients;
  m is the feedforward filter order; and
  X is the input signal.

The frequency response of the transfer function is then defined in Equation 5 as:

$$H(e)^{jw}=\frac{B(e)^{jw}}{A(e)^{jw}}=\frac{b[1]+b[2]e^{-jw}+\ldots+b[m+1]e^{-jmw}}{a[1]+a[2]e^{-jw}+\ldots+a[n+1]e^{-jnw}} \quad \text{(Eq. 5)}$$

Equation 5 can be used to calculate the bandwidth of the IIR filter.

In certain situations, it may be desired to further minimize the computation order of the filter. In those cases, process 200 can proceed to step 212 where a single pole IIR can be implemented. The single pole IIR is then applied, at step 216, to the pseudo derivative of the tachometer zero crossing times. Furthermore, because the single pole IIR filter is run forwards and backwards in time, the transfer function is the conjugate square for any given set of filter coefficients, thus for example, where a=[1−0.9], b=1−a=0.1, the transfer function is simplified to Equation 6:

$$H(e)^{jw}=\frac{0.01}{1-1.81e^{-jw}+0.81e^{-j2w}} \quad \text{(Eq. 6)}$$

Operationally, the pseudo derivative adds the variance of two zero crossing times: effectively, $\sigma^2$ for zct[i], and $\sigma^2$ for delayed zct[i−1], which is $2\sigma^2$ for variance, and $\sqrt{2}\sigma$ as the standard deviation. Thus, advantageously, the pseudo derivative does not increase the noise of the system by √2, as would occur by taking the numerical derivative. Additionally, the pseudo derivative reduces the Gibbs effect (the overshoot of a Fourier series) by having the end points of the zero crossing signal as zero.

In an exemplary embodiment of the disclosed process, at step 216 the pseudo derivative can be generated by assuming the derivative of the shaft speed (e.g., rate of change in the shaft speed) is zero, then the change in time between each zero crossing point is found using Equation 7:

$$dt = (zct[n] - zct[1])/(n-1) \quad \text{(Eq. 7)}$$

Where n is the total number of zero crossings.

If zct[i] is the time of the zero cross at time i, then the pseudo derivative is constructed as shown in Equation 8, for i=1 to n:

$$Dzct[i] = zct[i] - dt*i \quad \text{(Eq. 8)}$$

Then, at step 220, the reduced jitter zero crossing times can be reconstructed by integrating the filtered pseudo derivative as set forth below.

```
for(i= 1 to n){
    zct[i] = (z1 + dt * (i-1)) + spd[i];
}
```

Example 1: Wind Turbine High Speed Shaft

Typically, large wind turbines have a main rotor rate of about 0.15 to about 0.25 Hz, or one revolution every four to six seconds. The period of the change of shaft rate is on the order of about 1.3 to about 2 seconds, with the change in rate being due, at least in part, to tower shadow and/or wind shear on the plurality of blades.

Figure 4:
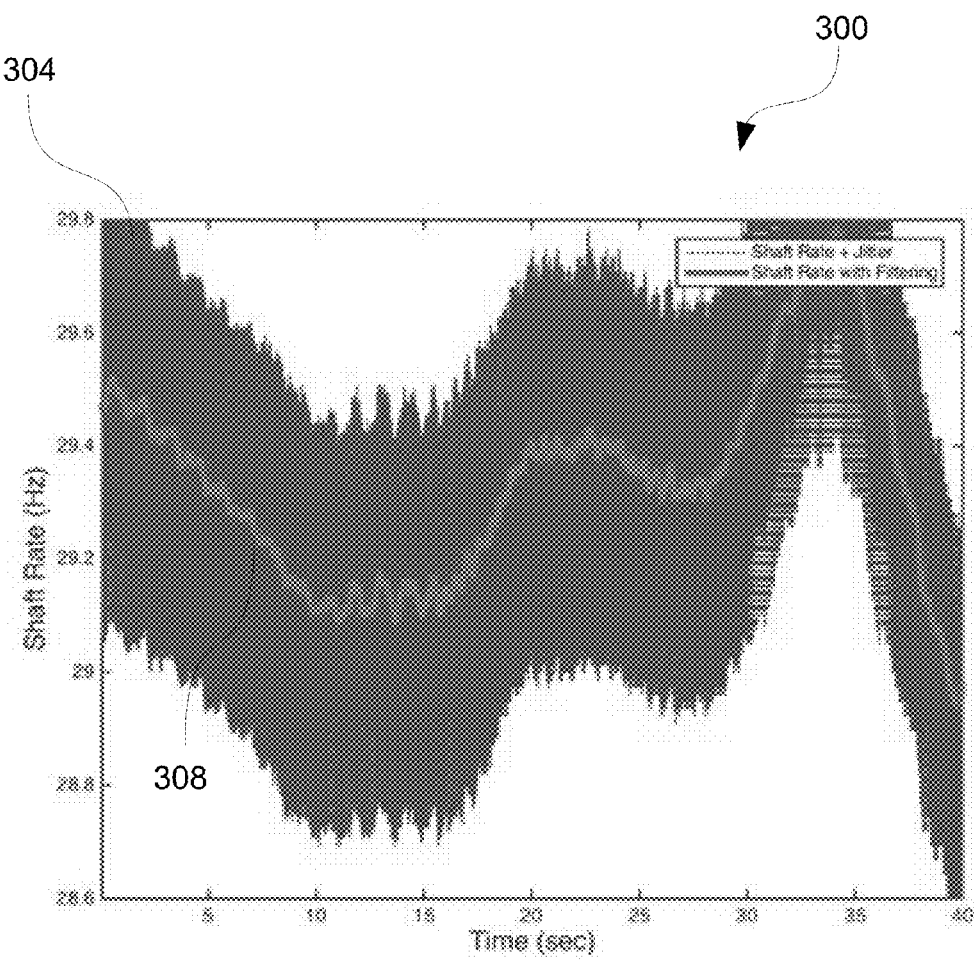
FIG. 4 is a graph showing shaft rate over time for a wind turbine.

FIG. 4 shows a graph 300 of shaft rate measurement over time for the wind turbine shaft of this example. In graph 300, large band 304 is the shaft rate with the jitter included, whereas narrow band 308 is the shaft rate with filtering performed as discussed above, i.e., the jitter has been substantially removed from the tachometer signal received from a tachometer sensor, such as tachometer sensor 104.

In this example, the jitter in the tachometer signal resulted from the finite precision of the timer and irregular spacing of the target on the shaft. With the jitter excluded, and as shown in graph 300, narrow band 308 reflects a low order, periodic change in shaft speed characteristic of the effect of tower shaft/wind shear.

Interestingly, this high speed shaft had a known fault: a soft tooth. A comparison of the gear component analysis with jitter and without jitter shows that removing jitter improves the analysis of this fault. This can be quantified by determining population statistics of analysis condition indicators (CIs) from a nominal machine compared to a machine with a gear defect, then measuring the populations' separability. Separability is the statistical distance between two populations and is the normalized distance based on the measurement variance and, advantageously, is a good measure of the ability of a CI to detect a fault (a separability of 3 is approximately a probability of false alarm (PFA) of 10'). Identification of Gear Fault Condition Indicators There are at least six failure modes for gears: surface disturbances, scuffing, deformations, surface fatigue, fissures/cracks, and tooth breakage. Each type of failure mode can generate a different fault signature. Notably, relative to the energy associated with gear mesh frequencies and other noise sources, the fault signatures are typically small. Prior art techniques to identify these different faults are based on the operation of the TSA.

In an exemplary embodiment, the fault is a broken tooth, and the following analyses were conducted (note the gear mesh frequency is found by taking the FFT of the TSA, i.e., taking the absolute value of the number teeth+1 bin).

1. Figure of Merit 0: the TSA peak-to-peak is divided by the sum of the 1st and 2nd gear mesh frequencies.

2. Residual Analysis: where shaft order 1, 2, and 3 frequencies and the gear mesh harmonics of the TSA are removed. Faults such as a soft/broken tooth generate 1 per rev impacts in the TSA. In the frequency domain of the TSA, these impacts are expressed as multiple harmonics of the 1 per rev. The shaft order 1, 2, and 3 frequencies and gear mesh harmonics in the frequency domain set to zero, and then the inverse FFT is performed, allowing the impact signature to become prominent in the time domain. Condition indicators are statistics of this waveform and can include the following: Root Mean Square (RMS), Peak 2 Peak (P2P), Crest Factor (CF), and Kurtosis.

3. Energy Operator (EO) is a type of residual of the autocorrelation function. For a nominal gear, the predominant vibration is gear mesh. Surface disturbances, scuffing, etc., generate small higher frequency values which are not removed by autocorrelation. Formally, the EO is: TSA2:n−1×TSA2:n−1×−TSA1:n−2×TSA3:n. The CIs of the EO are the standard statistics of the EO vector.

4. Narrowband Analysis (NB) operates on the TSA by filtering out all frequencies except that of the gear mesh and within a given bandwidth. It is calculated by zeroing bins in of the Fourier transform of the TSA, except the gear mesh. The bandwidth is typically 10% of the number of teeth on the gear under analysis. For example, a 23-tooth gear analysis would retain bins 21, 22, 23, 24, and 25, and their conjugates in frequency domain. Then the inverse FFT is taken, and statistics of waveform are taken. Narrowband analysis can capture sideband modulation of the gear mesh frequency due to misalignment or a cracked/broken tooth.

5. Amplitude Modulation (AM) analysis is the absolute value of the Hilbert transform of the narrowband signal. For a gear with minimum transmission error, the AM analysis feature should be a constant value. Faults will greatly increase the kurtosis of the signal.

6. Frequency Modulation (FM) analysis is the derivative of the angle of the Hilbert transform of the narrowband signal. FM analysis is capable of detecting changes of phase due to uneven tooth loading, which is a characteristic of a number of fault types.

Separability result:

| Analysis: | With Jitter | Jitter Removed | % Improvement |
|---|---|---|---|
| Residual RMS | 9.65 | 9.83 | 2% |
| Residual Kurt | 17.4 | 19.3 | 9.9% |
| Residual P2P | 14.82 | 16.19 | 9.2% |
| Residual CF | 6.11 | 7.91 | 26% |
| EO Kurtosis | 8.32 | 10.14 | 21.9% |
| FM0 | 8.67 | 9.05 | 5% |
| NB CF | 2.51 | 3.08 | 22% |
| AM RMS | 31.24 | 34.9 | 10% |
| FM RMS | 5.58 | 5.65 | 1% |
| FM Kurtosis | 15.4 | 16.01 | 4% |

In general, there is an improvement in separability when jitter is removed and in some instances an increase of 10% to over 25% when jitter is removed.

For a condition monitoring system where the CIs are transformed into a Health Indicator (HI), removing jitter can result in a large improvement in performance. In general, the HI is a function of CI distribution, where a whitening linear transform is used to map the CIs and to the HI. The whitening process is important because it ensures that the operational probability of false alarm (PFA, e.g., the rate of false alarms seen in the field data), is the same as the system designed PFA. The scale and offsite of the transform are based on a generalized function of distribution technique. This transform constructs an HI such that:

- the probability of a nominal component having an HI greater than about 0.5 is less than about 10e-6, e.g., PFA is 1-10e-6;
- when the HI is greater than about 0.75 and less than about 1.0, the component is in warning (plan on scheduling maintenance); and
- when the HI is greater than about 1.0, continued operations could result in collateral damage to the gearbox or degradation in system performance.

In the instance of a 25% increase of separability, as achieved through jitter reduction, a machine operator would be alerted to scheduling maintenance (at a 0.75 HI level), where other systems not controlling for jitter would still show a nominal component.

Example 2: High Speed Input Shaft

In this example, the tachometer sensor is measuring a 3 per revolution coupling on the high speed shaft of a helicopter gearbox. The bracket is soft, such that the imbalance of the input shaft is causing the bracket to vibrate. Thus, the change in displacement of the tachometer sensor relative to the shaft coupling is a source of jitter. Graph 400 in FIG. 5 shows shaft rate over time with the resulting signal with jitter 404 and signal without jitter 408.

Figure 5:
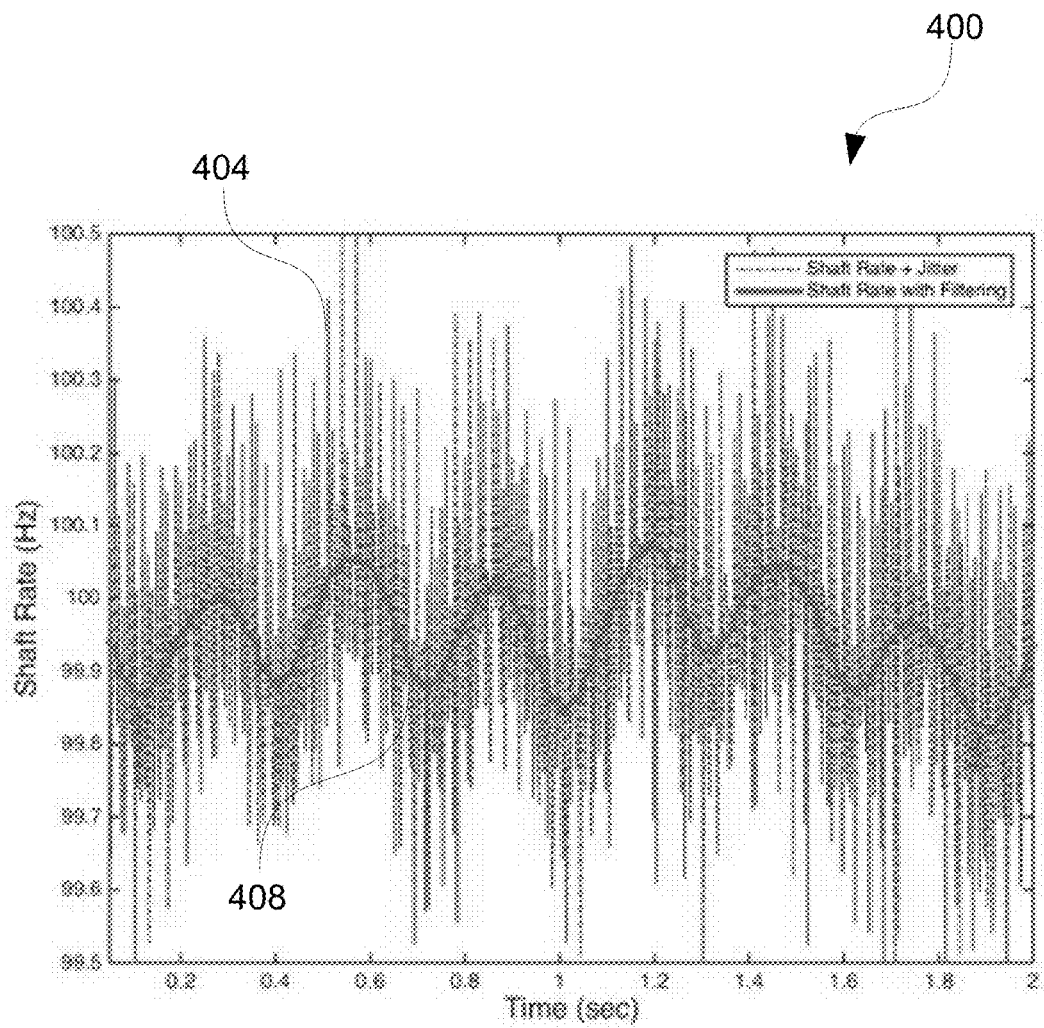
FIG. 5 is a graph showing shaft rate over time for a high speed shaft example.

As shown in FIG. 5, there is an underlying 2 to 3 Hz control loop causing a change in shaft rate of approximately 0.07 Hz. Because the shaft rate, and the resulting tachometer signal, is time varying, in this embodiment the tachometer signal should be resampled to accurately determine the cause of the jitter. In an exemplary embodiment, cubic spline interpolation is used.

Figure 6:
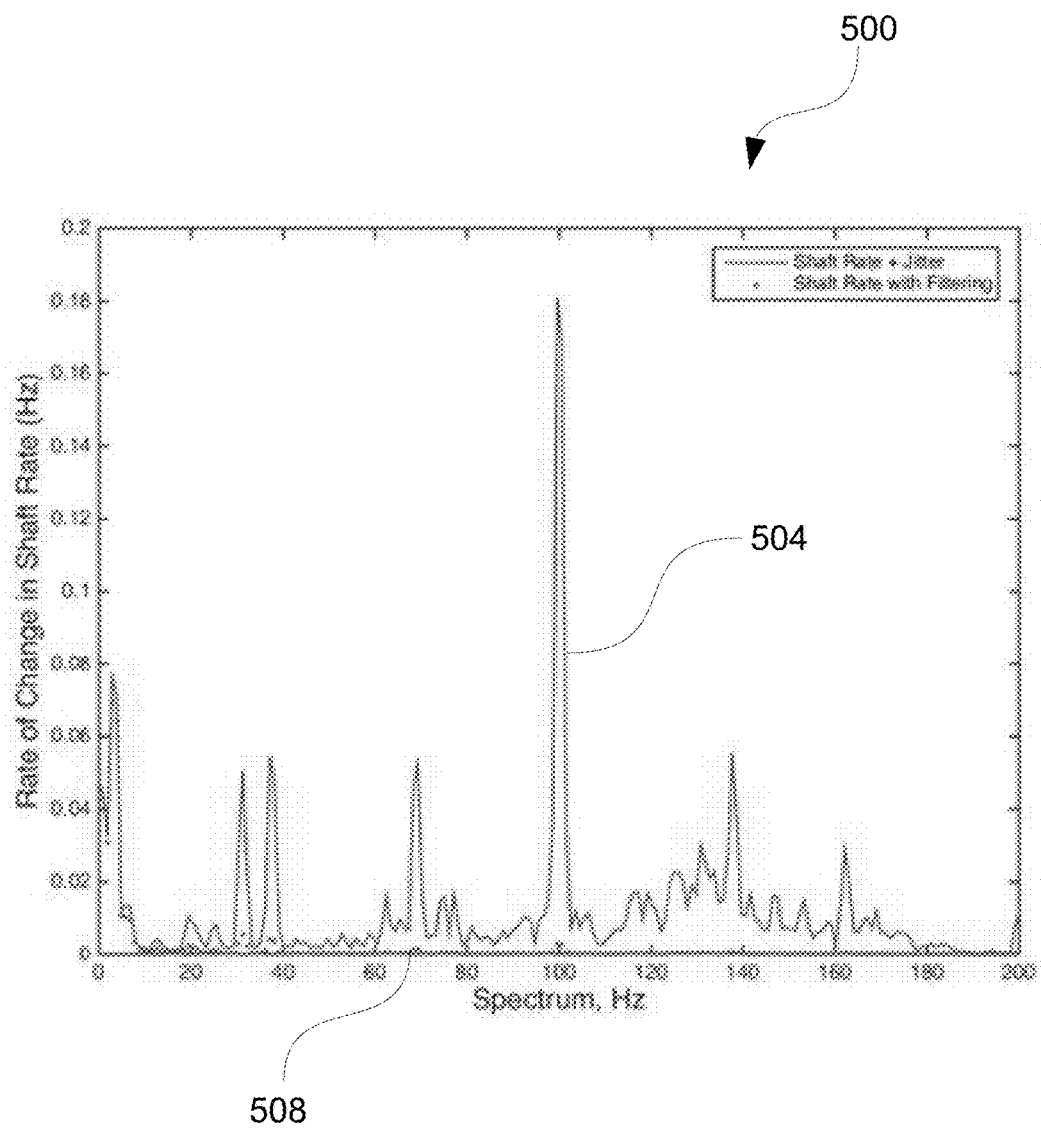
FIG. 6 is a graph of the change in shaft rate (Hz) over spectrum (Hz) for a high speed shaft example.

FIG. 6 is a graph 500 of the change in shaft rate (Hz) over spectrum (Hz)—also referred to as a cubic spline—with a shaft rate with jitter 504 and a shaft rate without jitter 508. Graph 500 can be used to interpolate the tachometer time to an apparent delta time of 0.001 second (e.g., the interpolated sample rate is 1000 Hz). As shown, the predominant cause of the jitter in this example is at about 100 Hz, which correlates to a 0.18 Hz change in shaft rate due to jitter and which is associated with the gearbox input shaft rate.

In this example, there are 31.25 Hz sidebands (at 69.75 and 131.25 Hz, with a value of 0.06 Hz change in shaft rate), which are likely a result of the tachometer sensor bracket resonance. The control loop change in shaft rate (FIG. 5) can now be quantified as 2.93 Hz with a 0.075 Hz change in shaft rate, as shown in FIG. 6.

As discussed above, it is desirable to ensure a zero phase change as a result of removing jitter. With the spline interpolated tachometer signal, it is possible to compare the effect of filtering on the 2.93 Hz control loop, which is a feature that should remain in the tachometer signal. The phase angle of the control loop is the arctangent of the ratio of the imaginary to real Fourier transform, evaluated at the frequency of interest. The phase for the unfiltered tachometer signal is, in this example, 347.1535 degrees, while the phase of tachometer signal with the jitter removed is 347.192. The difference of 0.3% between the two aforementioned values can be attributed to the relatively short signal (2000 points) and noise, and will not affect the performance of the TSA or TSR.

Optimal Selection of the Filter Coefficient for Jitter Reduction

Every mechanical system has a bandwidth that represents the frequency at which half (e.g., 3 dB) of the signal is removed. For example, as shown in FIG. 5, the control loop bandwidth is 3 Hz. This is a feature that should remain in the tachometer signal, as it is not associated with jitter. For this example, the bandwidth of the filter for jitter removal should be 3 Hz/100 Hz, or greater than 3%.

The relationship between the filter coefficients b and a in Eq. 3 (above) is that b=1−a, such that Eq. 3 can now be written as Equation 9:

$$H(e)^{jw} = \frac{b*b}{1 - 2*a*e^{-jw} + a*a*e^{-j2w}} \quad \text{(Eq. 9)}$$

Where:
- w is the allowable percent change in shaft speed (say 5% for this example)*π; and
- j is sqrt(−1)

Figure 7:
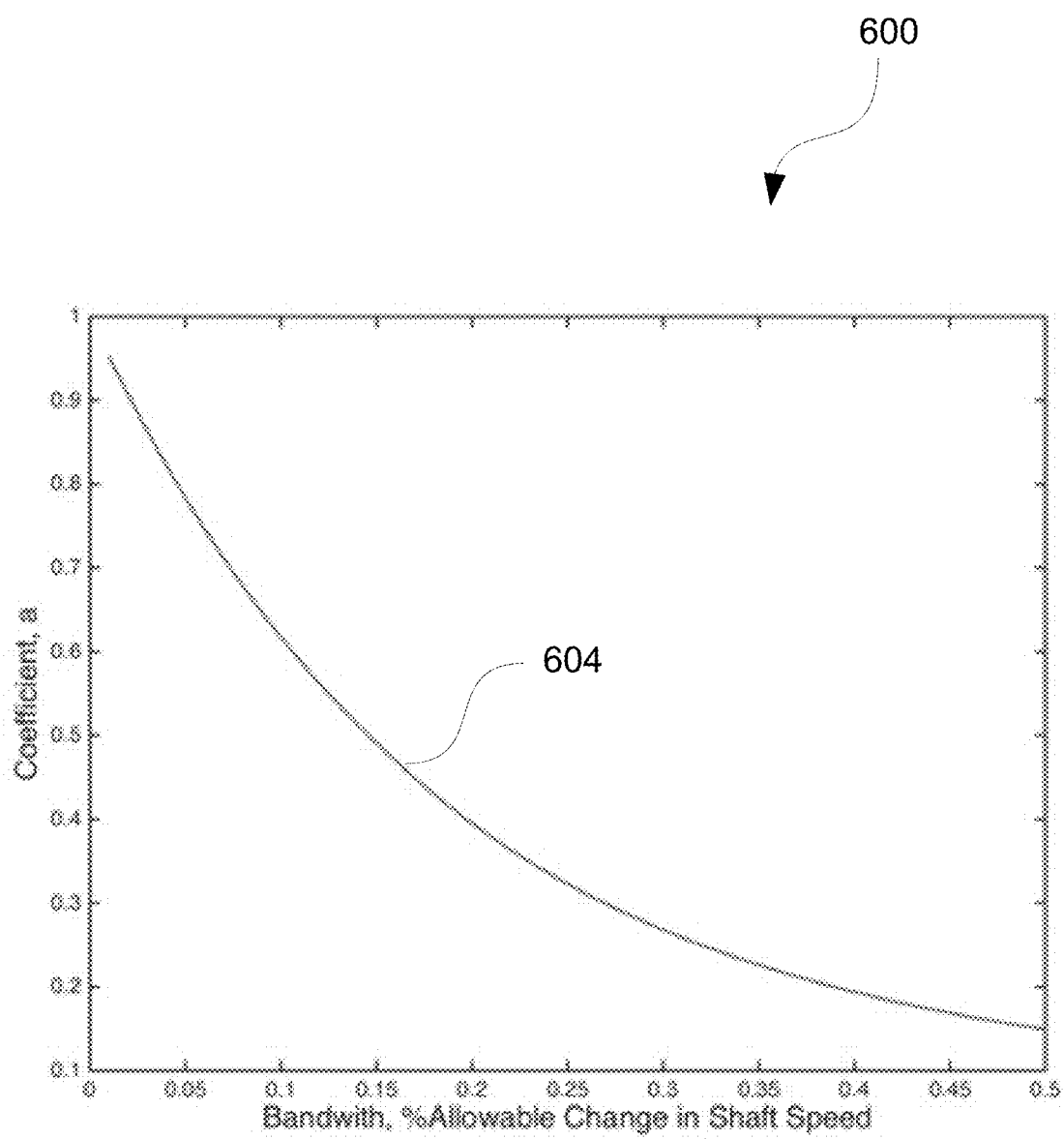
FIG. 7 is a graph of the filter coefficient, a, over bandwidth for a high speed shaft example.

Equation 9 allows for simple Newton-Raphson optimization techniques to be used to solve for the filter coefficient a by setting the target value of −3 dB, with the objective function being (−3 dB−abs($H(e)^{jw}$)$^2$. For the Newton-Raphson to converge, the objection function must be continuous and a derivative must exist, which this function supports. Using the optimizer procedure, the value of coefficient a can be found for any bandwidth (as shown by curve 604 in graph 600 of FIG. 7). Thus, for example, for a bandwidth of 0.05, the coefficient a is 0.7837.

Use of an IIR Filter for Online/Real Time Shaft Speed Calculation

Because of the low computational burden, a modified IIR filter technique can be used for an online/real time embedded system to determine the shaft rate. This capability is often important for equipment in which it is important to report an over speed condition or for a control system where an over speed condition requires the machine to be stopped and inspected.

The pseudo code below outlines the process for detecting the length of time and maximum value of an over speed condition:

```
spd_1 = low limit of rotational speed. No analysis
is conducted when the shaft is not turning.
time_1 = 0;
aCoef = .95;
bCoef = 1− aCoef;
overspeed = false;
maxOverSpeed = 0;
ppr = pulses per revolution. When the next tachometer
time is received (i.e., the next time of the
zero cross or rising edge of the tachometer signal):
dt = crt_time − time_1;
if dt > 0,
spdt = aCoef * spd_1 + bCoef/(ppr*dt);
spd_1 = spdt;
end
```

The aforementioned calculation provides an estimate of the shaft rate. Then, the filter response, bandwidth, and phase delay can be calculated via Equation 10 as:

$$H(e)^{jw} = \frac{bCoef}{1 - a*e^{-jw}} \quad \text{(Eq. 10)}$$

To trigger an alert and to start measuring the time/intensity of the over speed:

```
if spdt > max RPM, and overspeed == false, then
    overspeed = true
    starttimeOverspeed = time;
end
if overspeed == true and spdt > max RPM
    if spdt > maxOverSpeed,
        maxOverSpeed = spdt;
    end
end
```

At the end of the over speed:

```
if overspeed == true and spdt < normalSpeed
    endtimeOverspeed = time;
    reportMaxOverSpeed = maxOverSpeed;
    maxOverSpeed = 0;
end
```

For a real time system, the ability to filter helps reduce false alarm rates. The small phase lag introduced by the filter should be greater than about 2 tachometer pulses. As an example, for a 100 Hz shaft with a 19-tooth pinion, the phase delay will be effectively zero for effects that are less than the bandwidth of the system and, for all cases, is less than 1.1 milliseconds.

Figure 8:
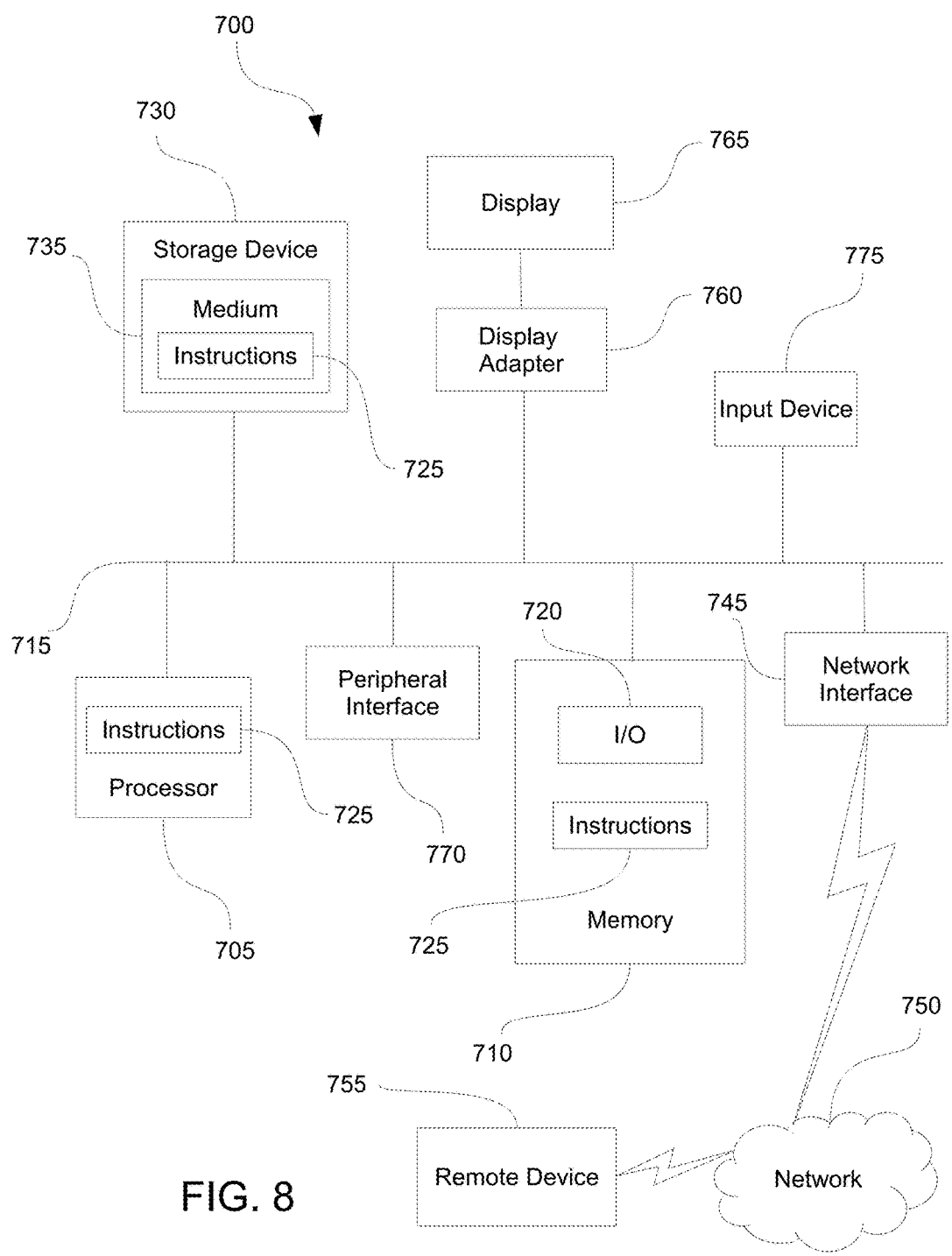
FIG. 8 is a block diagram of a computing system suitable for use with a tachometer signal jitter reduction system according to an embodiment of the present invention.

FIG. 8 shows a diagrammatic representation of one embodiment of a computing device in the exemplary form of a computer system 700 within which a set of instructions for causing a system, such as a tachometer jitter reduction system 100, to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 700 includes a processor 705 and a memory 710 that communicate with each other, and with other components, via a bus 715. Bus 715 may include any of several types of bus structures including, but not limited to, a memory bus, a memory controller, a peripheral bus, a local bus, and any combinations thereof, using any of a variety of bus architectures.

Memory 710 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 720 (BIOS), including basic routines that help to transfer information between elements within computer system 700, such as during start-up, may be stored in memory 710.

Memory 710 may also include (e.g., stored on one or more machine-readable media) instructions (e.g., software) 725 embodying any one or more of the aspects and/or methodologies of the present disclosure. In another example, memory 710 may further include any number of program modules including, but not limited to, an operating system, one or more application programs, other program modules, program data, and any combinations thereof.

Computer system 700 may also include a storage device 730. Examples of a storage device (e.g., storage device 730) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 730 may be connected to bus 715 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 730 (or one or more components thereof) may be removably interfaced with computer system 700 (e.g., via an external port connector (not shown)). Particularly, storage device 730 and an associated machine-readable medium 735 may provide nonvolatile and/or volatile storage of machine-readable instructions, data structures, program modules, and/or other data for computer system 700. In an exemplary embodiment, storage device 730 is non-transitory storage medium. In one example, software 725 may reside, completely or partially, within machine-readable medium 735. In another example, software 725 may reside, completely or partially, within processor 705.

Computer system 700 may also include an input device 775, such as, but not limited to, tachometer sensor 104. In one example, a user of computer system 700 may enter commands and/or other information into computer system 700 via input device 775. Examples of an input device 775 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 775 may be interfaced to bus 715 via any of a variety of interfaces (not shown) including, but not limited to, a serial interface, a parallel interface, a game port, a USB interface, a FIREWIRE interface, a direct interface to bus 715, and any combinations thereof. Input device 775 may include a touch screen interface that may be a part of or separate from display 765, discussed further below. Input device 775 may be utilized as a user selection device for selecting one or more graphical representations in a graphical interface as described above. Input device 775 may also include sensors, such as a tachometer sensor as discussed above. The output of the sensors can be stored, for example, in storage device 730 and can be further processed to provide, for example, analysis of the clamp force value over time, by processor 705.

A user may also input commands and/or other information to computer system 700 via storage device 730 (e.g., a removable disk drive, a flash drive, etc.) and/or network interface device 745. A network interface device, such as network interface device 745 may be utilized for connecting computer system 700 to one or more of a variety of networks, such as network 750, and one or more remote devices 755 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 750, may employ a wired and/or a wireless mode of communication. In general, any network topology may be used. Information (e.g., data, software 725, etc.) may be communicated to and/or from computer system 700 via network interface device 745.

Computer system 700 may further include a video display adapter 760 for communicating a displayable image to a display device, such as display device 765. Examples of a display device include, but are not limited to, a liquid crystal display (LCD), a cathode ray tube (CRT), a plasma display, a light emitting diode (LED) display, and any combinations thereof. Display adapter 760 and display device 765 may be utilized in combination with processor 705 to provide a graphical representation of a utility resource, a location of a land parcel, and/or a location of an easement to a user. In addition to a display device, a computer system 700 may include one or more other peripheral output devices including, but not limited to, an audio speaker, a printer, and any combinations thereof. Such peripheral output devices may be connected to bus 715 via a peripheral interface 770. Examples of a peripheral interface include, but are not limited to, a serial port, a USB connection, a FIREWIRE connection, a parallel connection, and any combinations thereof.

Generation of Tachometer Signal from Vibration Sensor Data

Vibration signals from rotating equipment are sinusoidal and, by definition, synchronous with the rotation of the shaft of the equipment. However, the nature of vibration makes it impossible to use vibration data to generate a tachometer signal without significant processing of the data from the vibration sensor.

Measured vibration is the superposition (i.e., addition) of many signals in time. For example, for a simple 32-tooth gear gearbox with an input shaft, output shaft, and a gear pair in which the input shaft turns at 30 Hz, the output shaft has an 82-tooth gear with a speed of 11.707 Hz. The gear mesh frequency in this example would be 960 Hz (30×32). It is likely that this gear mesh frequency will have side bands as a result of any shaft imbalance being modulated onto the gear mesh. This can be proved using the trigonometric identity $\cos(a) \times \cos(b) = \frac{1}{2}[\cos(a+b) + \cos(a-b)]$, where in this example, $\cos(a)$ is 960 Hz and $\cos(b)$ is 30 Hz for the input shaft and/or 11.707 Hz for the output shaft. Additionally, if the shaft is bent or bowed, there will be a vibration component that is two times the frequency associated with the primary rotational aspect of the shaft. Other manufacturing defects, such as the gear not being mounted perpendicular to the shaft or not centering the shaft or the gear (i.e., eccentricity), would also add additional tone. This information can be extracted from vibration signals by using a band pass filter as described below.

A band pass filter is the convolution of a low pass filter with a high pass filter. These filters can preferably be implemented as Finite Impulse Response (FIR) filters to improve their stability. Unfortunately, even rather large filters have poor response. Consider a case of a wind turbine gearbox, with an aforementioned approximately 29 Hz shaft and a 32-tooth gear, with a resulting frequency of 928 Hz. To exclude the frequencies associated with the high speed shaft (e.g., 29*32−29=899 Hz and 29*32+29=957 Hz), the bandwidth of the filter is set from 910 Hz to 950 Hz. The filter response for this case, using a prior art 120 tap FIR filter, is shown in graph 800 in FIG. 9 of acceleration versus frequency of a signal 804 of a gearbox from a wind turbine high speed shaft. Note that the bandwidth (50% power, 3 dB) of this filter is 1670 Hz. The filter does not reject the spectral content at 500 Hz or at 1121 Hz. These additional tones distort the desired analytic signal, reducing the quality of the resulting tachometer signal.

In order to obtain an improved analytical tachometer signal, the following process, outlined in pseudo code, to recover a tachometer signal from vibration data is implemented:

Define: sample rate=sr. The number of data points of vibration data, n, equals sr×acquisition length in seconds.
1. Calculate the next larger radix-2 length for the FFT with nRadix=$2^{\text{ceil}(\log_2(n))}$ where ceil is the ceiling operator.
2. Calculate the low and high bandwidth index (bwlow, bwhigh), which are centered at a known gear mesh frequency.
3. Take the zero padded FFT of the vibration data. (Zero padding means adding zeros to the end of a time-domain signal, which increases the length of the signal in the time dimension.)
4. Zero the data of the FFT from zero to bwlow, and from bwhigh to nRadix.
5. Take the inverse FFT.
6. Calculate the unwrapped argument of the signal from 1 to n time series.
7. Normalize the time series of radians by the number of teeth of the gear (assuming $1^{st}$ harmonics).
8. Interpolate the number of indexes for every $2\pi$ radians.
9. Normalized to tachometer zero crossing times by sr.

For a process in which developing the analytic signal using an ideal filter is completed in a single functional process, the analytic signal is defined for the real valued signal as a function of time, s(t), in Equation 11:

$$S(f) = F\{s(t)\} \quad \text{(Eq. 11)}$$

where F is the Fast Fourier Transform. Then the following adjustments are applied based on the value of f $$S_a(f) = S(f), f=0 \quad \text{(Eq. 12)}$$

$$S_a(f) = 2S(f), f>0 \quad \text{(Eq. 13)}$$

$$S_a(f) = 0, f<0 \quad \text{(Eq. 14)}$$

$$s_a(t) = F^{-1}(S_a(f)) \quad \text{(Eq. 15)}$$

where S(f) is, as previously noted, the Fourier Transform of s(t), and $S_a(f)$ is the adjusted Fourier Transform of the signal. The inverse Fourier Transform is taken of $S_a(f)$ to produce $s_a(t)$, which is the generated tachometer signal as a function of time.

For a signal which is sampled for six seconds at 97,656 samples per second, the total length n of s(t) is 585,936 data points. As noted, there are advantages to using radix-2 lengths for the Fast Fourier Transform (FFT). By zero padding the FFT to stretch the signal to the closest larger radix-2 value, in this example $2^{20}$ or 1,048,576, the index representing the cutoff frequency for the band pass frequencies are bwlow=910 Hz/97656×1048576=9771 Hz and bwhigh=960/97656*1048576=10308 Hz. A band pass analytic signal can be obtained by applying the conditions of Equations 16 and 17 and then using Equation 15:

$$S_a(f) = 2S(f), \text{bwlow} \leq f \leq \text{bwhigh} \quad \text{(Eq. 16)}$$

$S_a(f)=0, f<bw\text{low}, f>bw\text{high}$ (Eq. 17)

$s_a(t)=F^{-1}(S_a(f))$ (Eq. 15)

Figure 9:
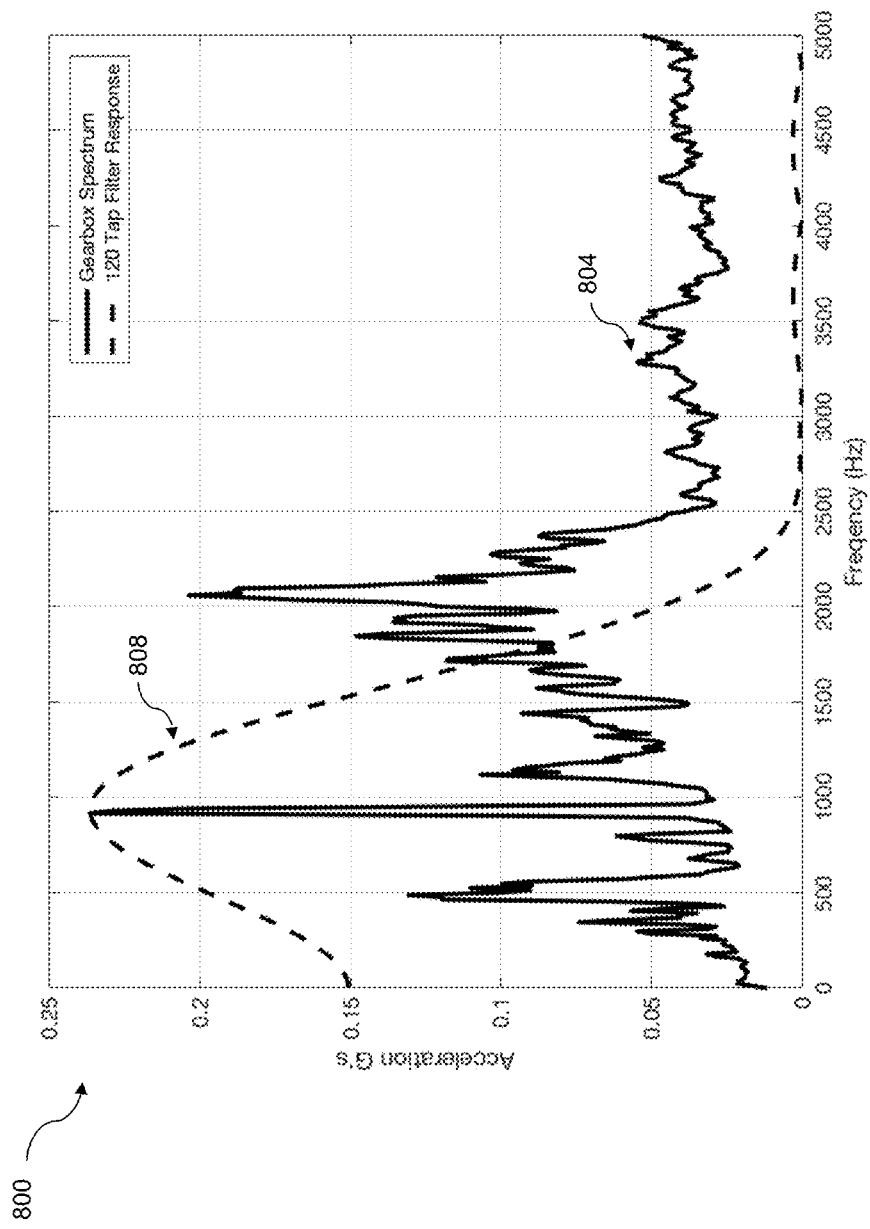
FIG. 9 is a prior art graph of a gearbox spectrum from a wind turbine high speed shaft and a response with a 120 tap Finite Impulse Response (FIR) bandpass filter.
Figure 10:
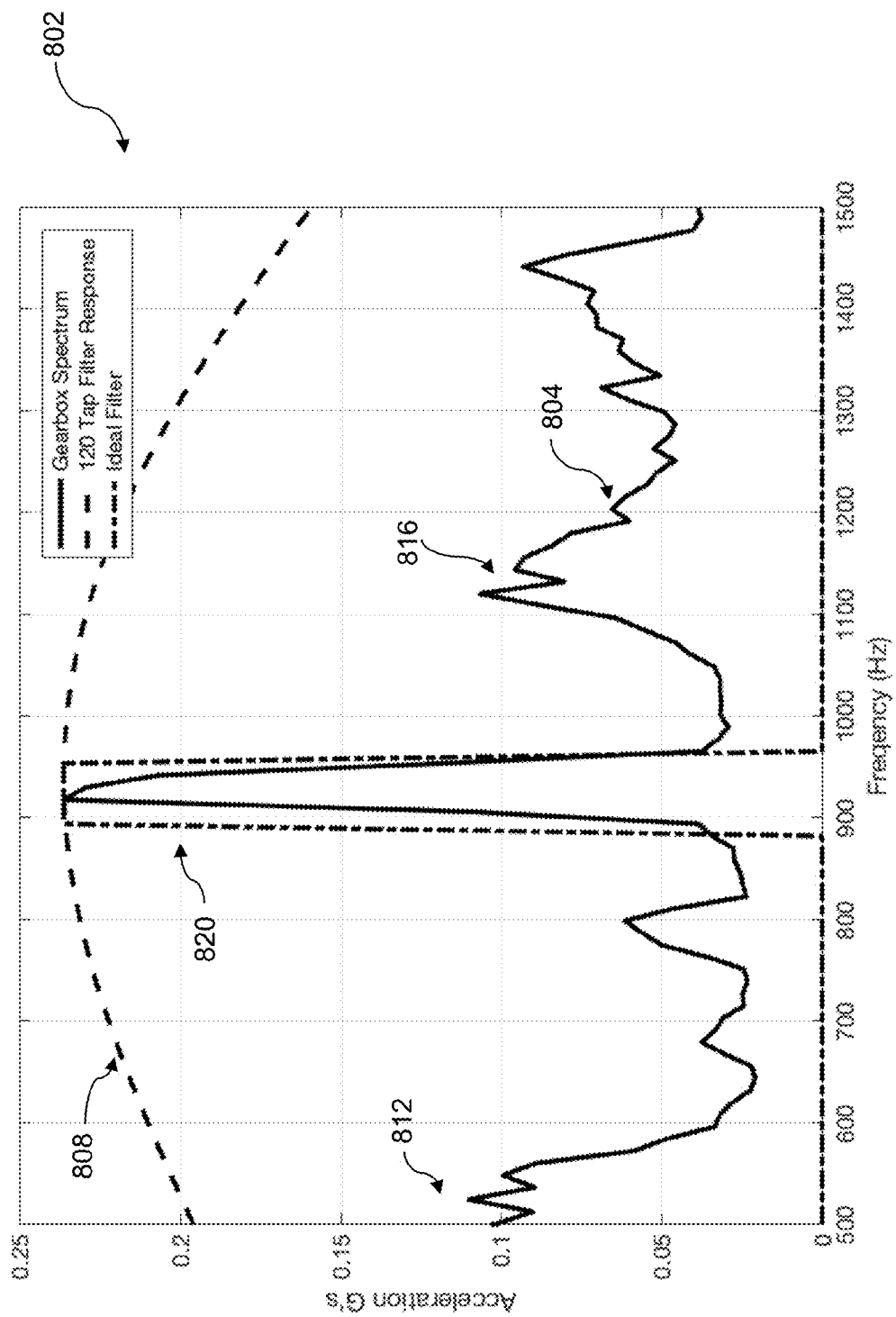
FIG. 10 is a graph comparing the FIR band pass filter and the idealized filter realized using Eq. 15 below.

There is no need to multiply by 2 in this instance since the argument (i.e., angle) of interest is the arctangent ratio of the imaginary parts of $s_a(t)$ and the real parts of $s_a(t)$. The approximately idealized band pass function rejects all signals not associated with the desired pass band. A zoomed view 802 of a portion of the graph 800 of FIG. 9 is shown in FIG. 10 with an overlay of the pass band of the approximately idealized filter realized using Equation 15 to allow a comparison to unprocessed signal. Note that the FIR filter does not reject the 500 Hz tone 812 or the 1150 Hz tone 816. The approximately idealized filter captures only a signal 820 associated with the desired gear mesh tone. This allows for higher signal-to-noise ratio and improved reconstruction of the tachometer signal from vibration data. This tachometer signal 808 is recovered from the arctangent of the analytic signal.

Further, the arctangent function returns radians between 0 to π and −π to 0, but it is the evolution of the angle that represents the incremental increase in phase for each sample in time. For example, the phase of the analytic signal for three cycles is 2π×3 or 6π. The arctangent of that signal will range from −π to π for three cycles. The result of the arctangent must be unwrapped to capture any increases in phase over time. Unwrapping of the phase angle requires keeping track of the previous angle and the current angle. The current angle is added to the previous angle, except when the returned arctangent goes from π to −π. In that case, π is added to the returned value to correct for the times when the returned value is between −π and 0.

The unwrapping of phase is outlined by the following pseudo code:

```
NormalizedAngle (x):
    1. x = modulo (x + π, 2π);
    2. If x < 0, x = x + 2π
    3. Return x − 2π
Unwrap (previous angle, current angle)
Return previous angle + NormalizedAngle
    (current angle − previous angle)
```

After unwrapping the phase angle, the units are in radians per sample. While the FFT and inverse FFT operate on the radix-2 length (in the example given that length is 1,048,576), the argument and phase angle computation are performed only on the original sample length, n. Note that this time series of radians is for the gear mesh. To convert to radians per revolution of the shaft, the time series is divided by the number of teeth in the gear, which in the example given is 32. However, it may be that the strongest gear mesh tone is the $2^{nd}$ or $3^{rd}$ harmonic, in which case the pass band is adjusted accordingly, and the time series of radian angle is divided by two times the number of teeth for the $2^{nd}$ harmonic, or three times the number of teeth for the $3^{rd}$ harmonic and so on.

The resulting time series represents the radian angle of the shaft, where each index advances the angle in time by dt, or 1/sample rate. Every 2π radians represents one shaft revolution. In order to relate radians of shaft revolution to the time, a form of interpolation is needed every 2π radians. For example, if the radian value of the index just prior to 2π is 6.282780795474 (0.0004 less than 2π) at array index 3395 and at array index 3396 the radian value is 6.284629142378 (0.0014 greater than 2π), then interpolation is required between array index 3395 and array index 3396 for a radian value at exactly 2π. In the given example, the interpolated value would be 3395.21885053316.

An exemplary outline for this process of linear interpolation, which gives the index value for each revolution, is provided by the following pseudo code:

```
Linear Interpolate
    radians is the time series array.
        1. Number of cycles = radians(n) / 2π
        2. count = 1;
        3. currentRadian = 2π * count;
    First find all the index just prior to each 2π revolutions
        4. For i = 1 to n
            a. If radians(i) > currentRadian
                i. Index[count] = i − 1
                ii. count = count + 1
                iii. If count > number of cycles, break
    Now interpolate
        5. For i = 1 to count
            a. currentRadian = 2π * i
            b. dCycles = currentRadian − radians(Index(i))
            c. dt = radians(Index(i) + 1) − radians(Index(i))
    cycles(i) = Index(i) + dCycles × dt
```

The above described process for estimating the tachometer zero cross signal can be corrupted by noise. The phase error standard deviation is related to the local signal-to-noise ratio at the mesh harmonic k as described by Equation 18:

$\sigma[\delta]=1/\sqrt{2}10^{-SNR/20}$ (Eq. 18)

Typical measured signal-to-noise ratios for this type of data/signal are 6 to 8 dB, which suggests that the standard deviation of the phase error would be about 6 to 10 degrees. This phase is zero mean (i.e., it averages out to zero), but it is non-zero (i.e., it includes portions that are greater than and less than zero), and therefore will add jitter to the generated tachometer signal. As such, it would be preferable to apply a jitter reduction technique to the generated tachometer signal, such as the forward/backward IIR filter jitter reduction technique described above or the low pass filter with FFT jitter reduction technique described below.

Reducing Jitter: A Low Pass Filter with FFT

As described above, one technique for reducing jitter from a tachometer signal is to use a forward/backward infinite impulse response (IIR) filter to reduce noise above the bandwidth of a shaft rate of change. While this technique can be used in many circumstances, it does not remove all noise above the bandwidth, and in fact can reduce some of the signal energy below the bandwidth cutoff (up to 50%). It may therefore be desirable to implement another jitter reduction technique involving a low pass filter with FFT.

Figure 11:
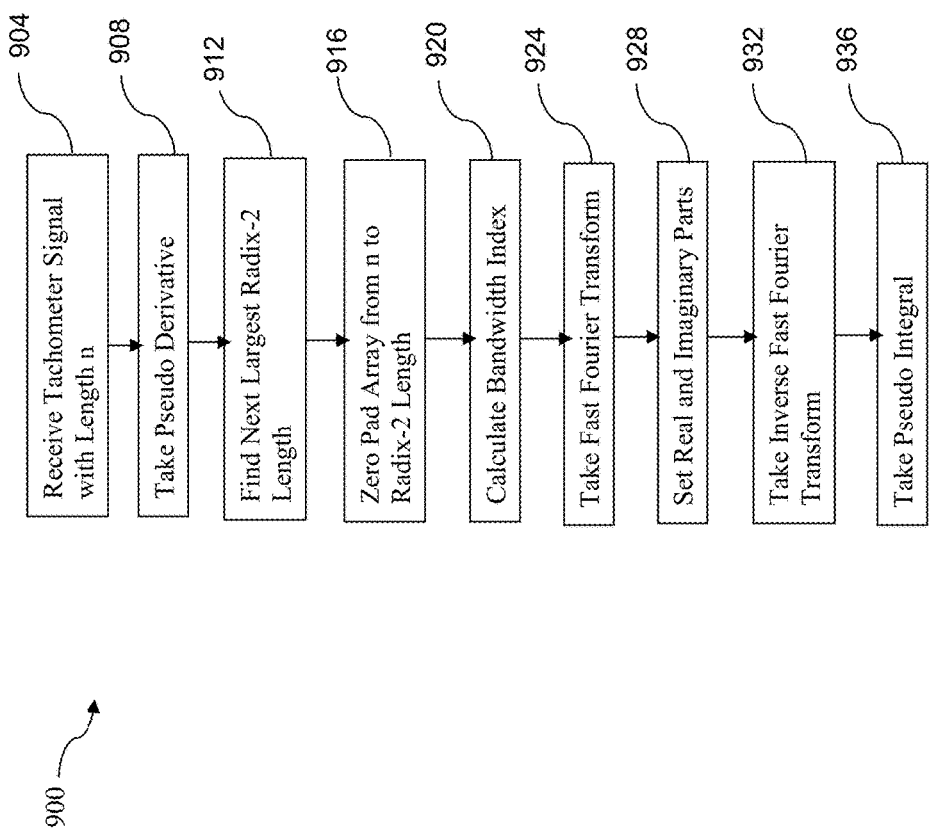
FIG. 11 is a block diagram of a low pass FFT jitter reduction technique according to an embodiment of the present invention.

A low pass FFT jitter reduction technique 900 is outlined in FIG. 11 and involves a low pass filter with FFT processing. This process acts as a zero phase filter. First, at step 904, a tachometer signal (either from a tachometer sensor or generated from vibration sensor data as described above) is received and the pseudo derivative of the tachometer signal is taken at step 908, where the pseudo derivative signal has a length of n. Then, at step 912, in order to be able to work with real FFT, a closest larger radix-2 length of the pseudo derivative signal of length n is calculated. The resulting array is then zero padded from n out to the radix-2 length at step 916.

A bandwidth index of the FFT is calculated at step 920 by, for example, applying a floor operator to the quantity found by dividing by two the product of the bandwidth and the radix-2 length as described in pseudo code below:

Index=floor(bandwidth*radix-2 length/2) (Eq. 19)

where the bandwidth is a normalized value, typically 0.15.

A real FFT is taken, meaning a Fast Fourier Transform is taken of the zero padded pseudo derivative of the tachometer signal, at step 924. Then at step 928 the real and imaginary parts of the FFT are set to zero from the Index (which is essentially the cut-off frequency) to the radix-2 length, at which point the inverse of the real FFT is taken at step 932. At step 936 a processed tachometer signal can be reconstructed by taking the pseudo integral of the tachometer signal that results from the above outlined process.

Figure 12:
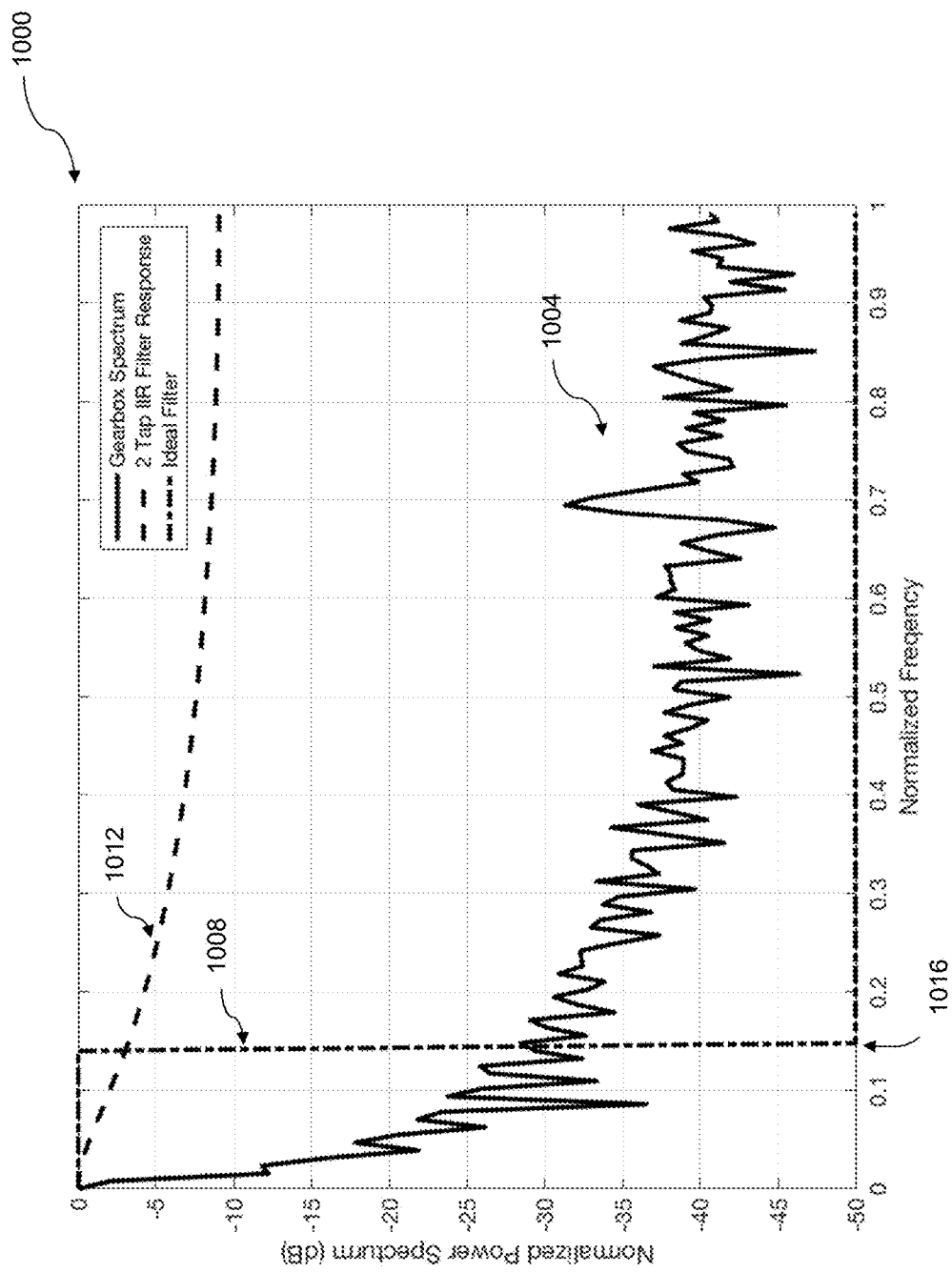
FIG. 12 is a graph comparing a tachometer pseudo derivative spectrum with a spectrum resulting from an infinite impulse response filter and an ideal low pass filter.

FIG. 12 shows a graph 1000 of normalized power spectrum versus normalized frequency for a gearbox tachometer signal 1004. As can be seen from ideal pass signal 1008, an ideal low pass filter effectively removes jitter from the tachometer signal while retaining more low frequency response than an IIR filtered signal 1012, and effectively removes all spectral power (jitter) above the cutoff frequency 1016 (0.15).

Example 3: High Speed Pinion on a Wind Turbine

A high speed pinion on a wind turbine was monitored using both an installed tachometer and a vibration sensor generated tachometer signal in accordance with the present invention. Wind turbine analysis can be particularly difficult due to a high degree of variability in shaft speeds. The installed tachometer thus served as a point of reference for comparison with the vibration based tachometer signal. The installed tachometer was a Hall sensor and a general purpose input/output architecture was used to capture zero crossing time. The monitored pinion had eight pulses per revolution, but time was calculated using each eighth pulse (because the eighth pulse marks one revolution). In this example, there is a ramp of approximately 1 Hz. The acquisition length was six seconds with a sample rate of 97,656 samples per second. The high speed shaft has a frequency of approximately 30 Hz.

Figure 13:
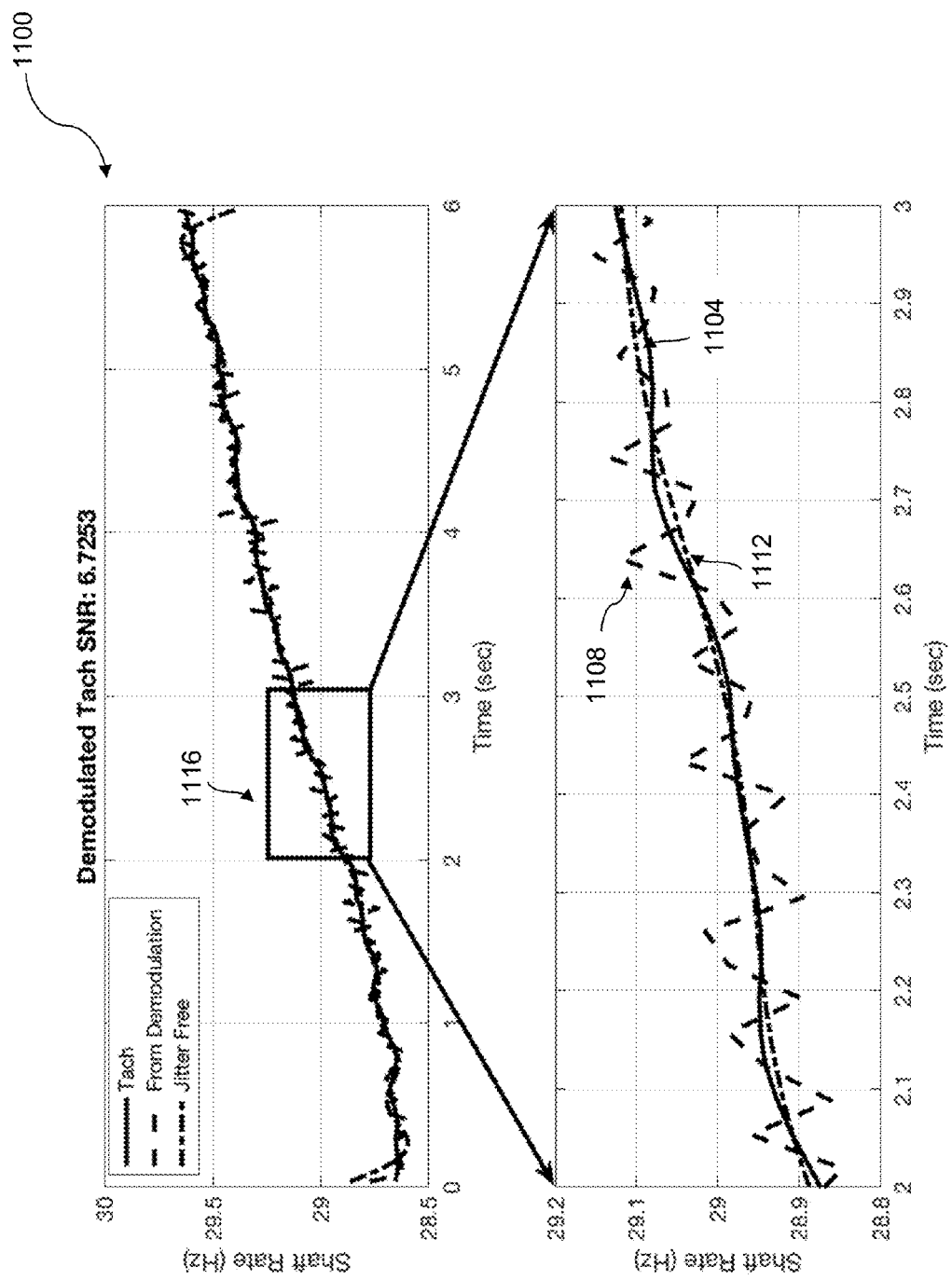
FIG. 13 shows a graph comparing a shaft rate derived from a Hall sensor tachometer signal to shaft rate derived from a vibration based tachometer signal as well as a shaft rate derived from a vibration based tachometer signal to which a low pass FFT jitter reduction technique was applied.

Results from this analysis are shown in FIG. 13, which shows a graph 1100 comparing shaft speed derived from the Hall sensor tachometer signal 1104 to shaft speed derived from the vibration based tachometer signal 1108 as well as shaft speed derived from the vibration based tachometer signal 1112 to which the low pass FFT jitter reduction technique was applied. As can be seen more clearly in a zoomed portion 1116 of graph 1100 shown in the lower half of FIG. 13, in general, after removing jitter using the new process, the jitter reduced vibration based tachometer signal is not significantly different from the tachometer derived from the Hall sensor.

Figures 14A, 14B:
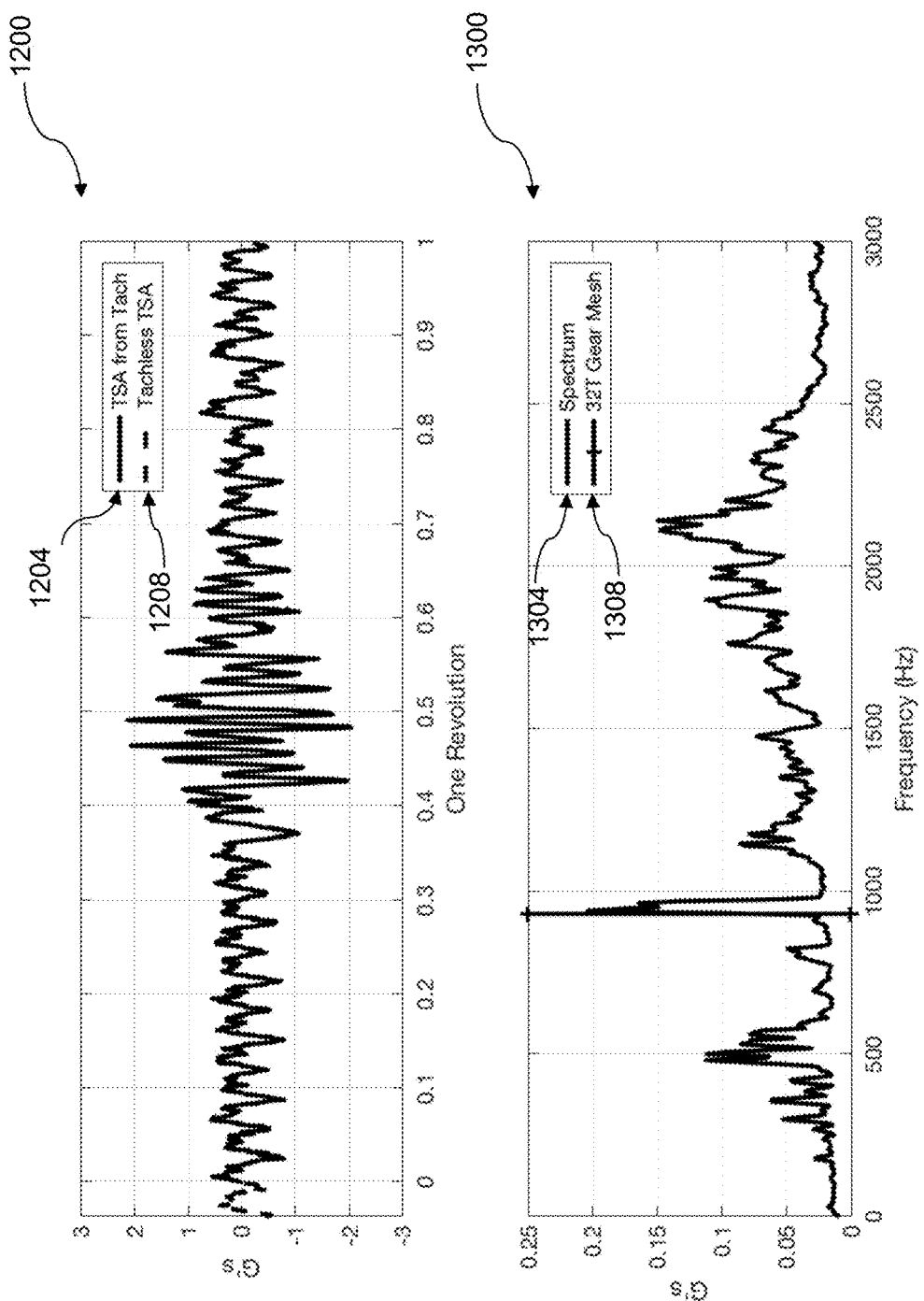
FIG. 14A is a graph of measured force over one shaft revolution for a TSA from a tachometer and a TSA from a vibration sensor generated signal.
FIG. 14B is a graph of measured force over a frequency range for a 32-tooth gear mesh and a vibration derived spectrum.

FIG. 14A is a graph 1200 of the measured force over one shaft revolution for a TSA from a tachometer signal 1204 and a TSA from a vibration sensor generated signal 1208. FIG. 14B is a graph 1300 of the measured force over a frequency range for a vibration derived spectrum 1304 with a 32-tooth gear mesh 1308 appearing at about 900 Hz. The difference between the TSAs in FIG. 14A is effectively only phase angle. From spectrum 1308, a signal-to-noise ratio can be calculated to be approximately 6. Typical vibration monitoring statistics derived from the TSAs are compiled in Table 1:

| Analysis | Hall Sensor based Tachometer | Vibration based Tachometer |
|---|---|---|
| Shaft Order 1 | 0.0100 g | 0.0104 g |
| Shaft Order 2 | 0.0013 g | 0.0016 g |
| Shaft Order 3 | 0.0019 g | 0.0018 g |
| TSA RMS | 0.5091 g | 0.4828 g |
| TSA Peak to Peak | 2.0887 g | 1.8430 g |

In FIG. 15A, a graph 1400 compares differences in amplitude modulation (AM) for a gear analysis for a TSA from a tachometer 1404 and a TSA from a vibration sensor generated signal 1408 for which a phase error has not been corrected. In FIG. 15B, a graph 1500 compares differences in frequency modulation (FM) for a gear analysis for a TSA from a tachometer 1504 and a TSA from a vibration sensor generated signal 1508 for which a phase error has not been corrected. Statistics from the gear analysis are compared in Table 2:

| Analysis | Hall Sensor based Tachometer | Vibration based Tachometer |
|---|---|---|
| FM0 | 4.278 g | 4.00 g |
| AM RMS | 0.100 g | 0.099 g |
| AM Kurtosis | 4.242 | 4.217 |
| FM RMS | 0.428 radians | 0.426 radians |
| FM Kurtosis | 4.995 | 4.844 |

Gear fault analysis is thus similar in this example using either a tachometer or a signal generated from a vibration sensor.

Example 4: Tail Rotor Intermediate Gearbox

Figure 16:
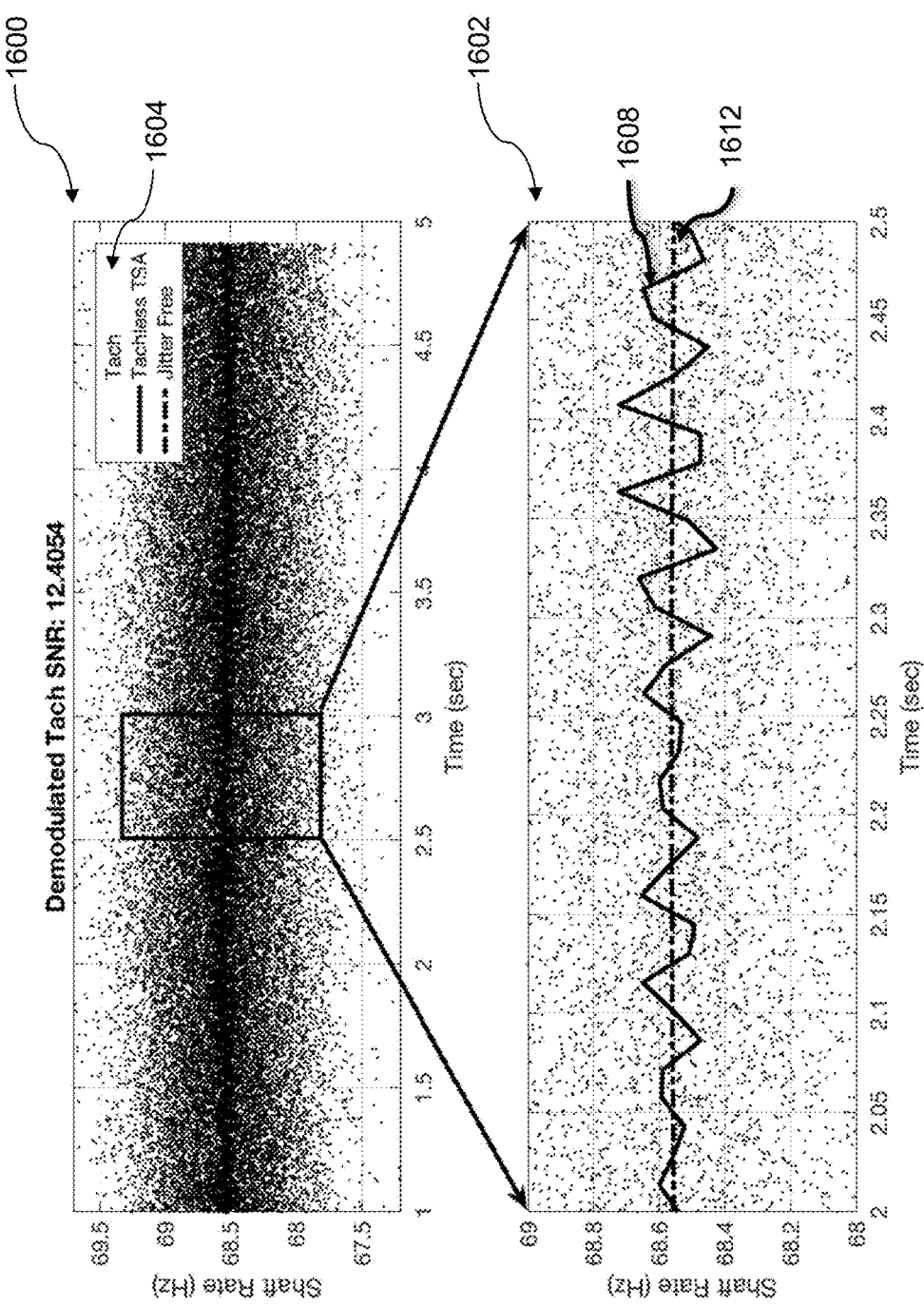
FIG. 16 is a graph derived from publicly available data showing shaft rate over time for a tachometer derived signal, a TSA from a vibration sensor generated signal, and the TSA with jitter reduction.

Graph 1600 shown in FIG. 16 was derived from public domain data from a test stand of a tail rotor intermediate gearbox. The sample rate was 100,000 samples per second and an ADC architecture was used for recording zero crossing data. A variable reluctance speed tachometer sensor was used with a 22-tooth gear as a target. The shaft rate for the target gear was approximately 3000 rpm (500 Hz), with a ratio from this shaft to the tail rotor drive shaft of 7.3:1. The same data was used as a starting point for the vibration sensor tachometer generation and the low pass FFT jitter reduction techniques. As can be seen in FIG. 16, a tachometer signal 1604 is very noisy (high jitter), with a shaft rate of about 68.5 Hz. A zoomed view 1602 shows more clearly that a vibration sensor derived tachometer signal 1608 is less noisy and another vibration based tachometer signal 1612 to which the low pass FFT jitter reduction technique was applied is relatively much smoother. The signal-to-noise ratio for this example is approximately 12, due to the close to 65 gear mesh frequency. The resulting vibration sensor derived TSA, aside from a difference in phase, is indistinguishable from the TSA obtained from using a variable reluctance sensor tachometer in that both TSAs provide the same information from a diagnostic and component monitoring perspective while the vibration sensor derived TSA is less noisy.

Figures 17A, 17B:
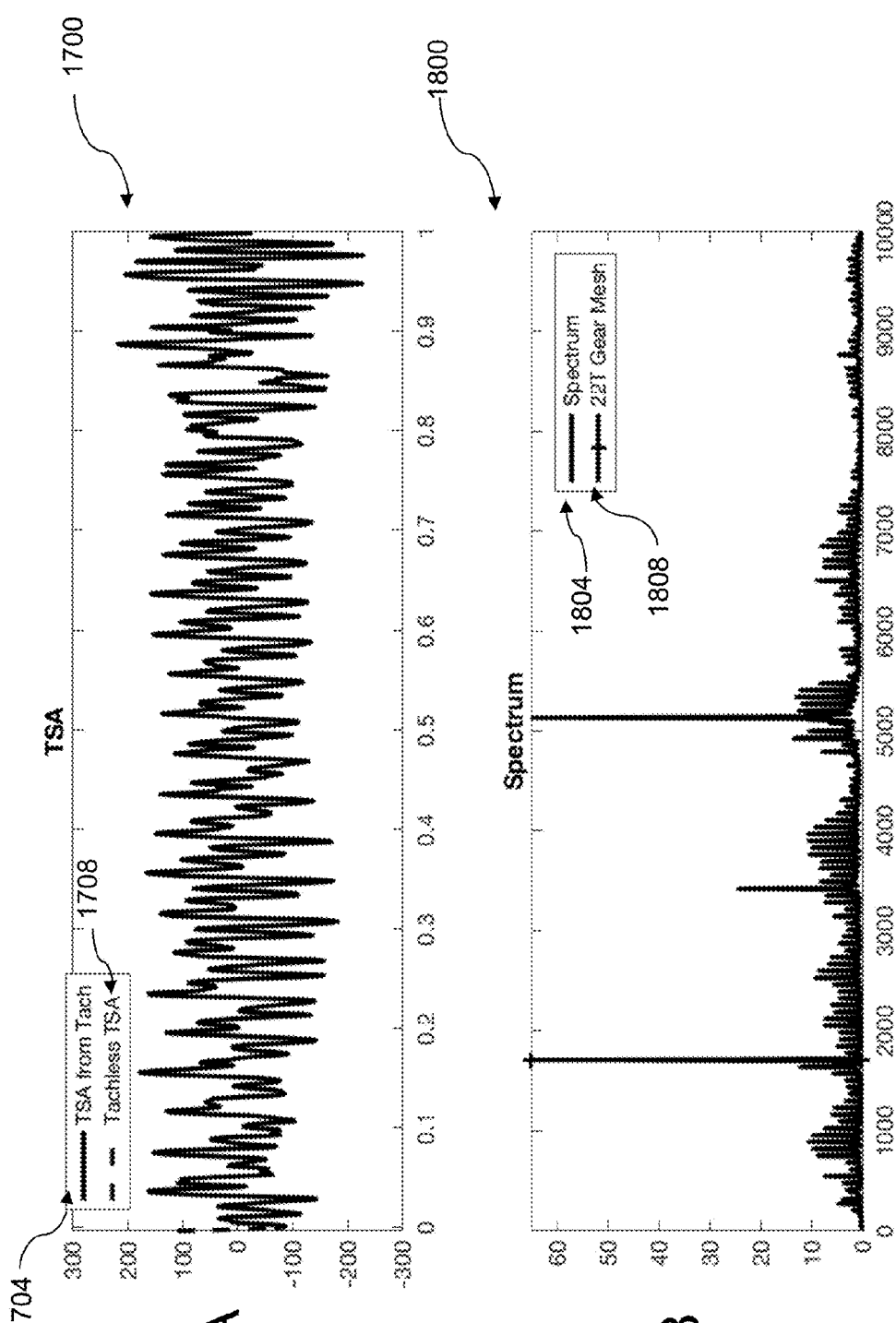
FIG. 17A is a graph of measured force over one shaft revolution for a TSA from a tachometer and a TSA from a vibration sensor generated signal.
FIG. 17B is a graph of measured force over a frequency range for a 22-tooth gear mesh and a vibration derived spectrum.

FIG. 17A is a graph 1700 of the measured force over one shaft revolution for a tachometer TSA 1704 and a vibration sensor generated signal TSA 1708. As can be seen, the tachometer TSA 1704 and the vibration sensor generated signal TSA 1708 almost completely overlap. FIG. 17B is a graph 1800 of the measured force over a frequency range of a vibration derived spectrum 1804 with a 22-tooth gear mesh 1808 appearing at around 1600 Hz. Statistics derived from the TSA for the tail rotor intermediate gearbox are given in Table 3:

| Analysis | Hall Sensor based Tachometer | Vibration based Tachometer |
|---|---|---|
| Shaft Order 1 | 0.043 g | 0.043 g |
| Shaft Order 2 | 0.283 g | 0.282 g |
| Shaft Order 3 | 1.855 g | 1.85 g |
| TSA RMS | 81.646 g | 81.591 g |
| TSA Peak to Peak | 222.77 g | 223.02 g |

Figure 18A:
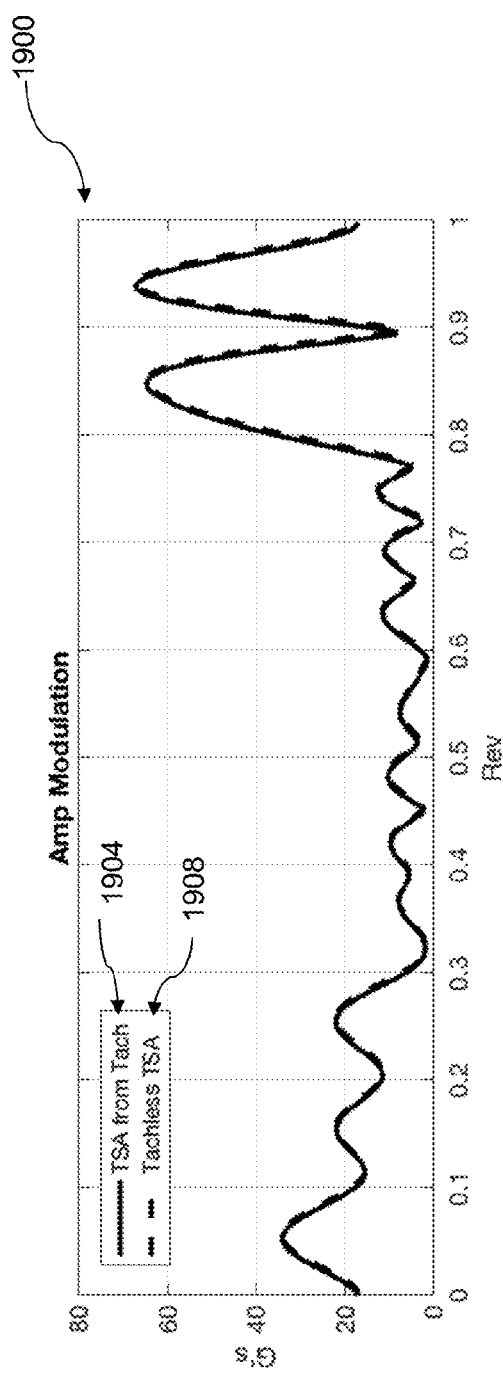
FIG. 18A is a graph comparing differences in amplitude modulation for a gear analysis for a TSA from a tachometer and a TSA from a vibration sensor generated signal for which a phase error has not been corrected.
Figure 18B:
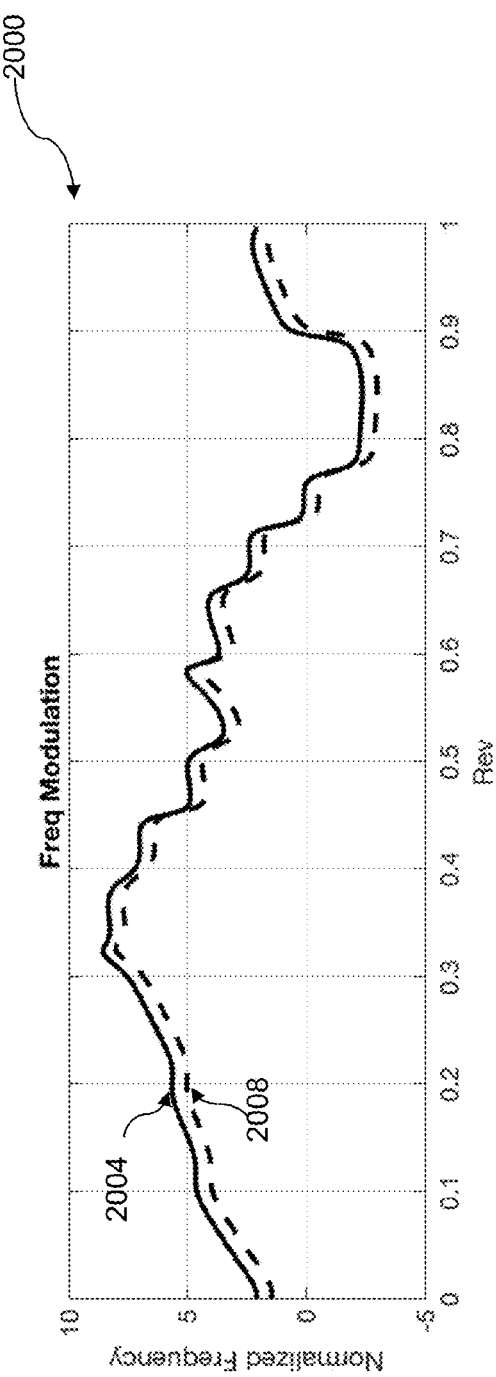
FIG. 18B is a graph comparing differences in frequency modulation for a gear analysis for a TSA from a tachometer and a TSA from a vibration sensor generated signal for which a phase error has not been corrected.

In FIG. 18A, a graph 1900 compares differences in amplitude modulation (AM) for a gear analysis for a TSA from a tachometer 1904 and a TSA from a vibration sensor generated signal 1908 for which a phase error has not been corrected. In FIG. 18B, a graph 2000 compares differences in frequency modulation (FM) for a gear analysis for a TSA from a tachometer 2004 and a TSA from a vibration sensor generated signal 2008 for which a phase error has not been corrected. Other than a slight change in phase, the analysis derived using either a tachometer sensor signal or a tachometer signal derived from a vibration sensor could be used for component monitoring purposes. Statistics from the gear analysis are compared in Table 4:

| Analysis | Hall Sensor based Tachometer | Vibration based Tachometer |
|---|---|---|
| FM0 | 16.94 g | 15.38 g |
| AM RMS | 17.06 g | 17.06 g |
| AM Kurtosis | 4.126 | 4.126 |
| FM RMS | 3.037 radians | 3.048 radians |
| FM Kurtosis | 2.46 | 2.45 |

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of generating a tachometer signal with reduced jitter comprising the steps of:
   receiving vibration data from a vibration sensor that monitors a rotating component;
   applying a band pass filter to the vibration data;
   using a fast Fourier transform to filter the vibration data;
   producing a tachometer signal from the transformed, filtered vibration data;
   applying a low band pass filter to the tachometer signal;
   fast Fourier transforming the filtered tachometer signal; and
   reconstructing a reconstructed tachometer signal with reduced jitter from the transformed, filtered tachometer signal.

2. The method of claim 1 wherein the step of producing a tachometer signal includes taking a pseudo integral.

3. The method of claim 1 wherein the step of producing a tachometer signal includes taking an inverse fast Fourier transform.

4. The method of claim 1 further including a step of normalizing tachometer zero crossing times by a sample rate of the vibration data.

5. The method of claim 1 further including a step of identifying variations on the tachometer signal unrelated to jitter.

6. A system of generating a tachometer signal comprising:
   a vibration sensor that produces a vibration signal representative of a spectral content of vibration of a rotating component, wherein the vibration signal includes n data points; and
   a controller that receives the signal from the sensor, wherein the controller generates a tachometer signal from the vibration signal by:
      determining a low bandwidth cutoff and a high bandwidth cutoff based on a gear mesh frequency,
      calculating a radix-2 length that is a closest larger value to n,
      zero padding the vibration data from n to the radix-2 length,
      taking a fast Fourier transform of the zero padded vibration data,
      zeroing the vibration data for which the fast Fourier transform was taken from zero to the low bandwidth cutoff and from the high bandwidth cutoff to the radix-2 length,
      taking an inverse fast Fourier transform of the zeroed, transformed vibration data, and
      normalizing the inverse-transformed vibration data.

7. The system according to claim 6, wherein the controller normalizes the generated tachometer signal to tachometer zero crossing times.

8. The system according to claim 6, wherein the controller interpolates a number of indexes for every 2π radians.

9. The system according to claim 6, wherein the controller normalizes a time series of radians by a number of teeth of a gear of the component assuming a first harmonic.

10. The system according to claim 6, wherein the controller normalizes a time series of radians by a number of teeth of a gear of the component assuming a second harmonic.

11. The system according to claim 6, wherein the controller normalizes a time series of radians by a number of teeth of a gear of the component assuming a third harmonic.

12. A method of reducing jitter in a tachometer signal comprising:
   receiving a tachometer signal;
   applying a low band pass filter to the tachometer signal;
   taking a fast Fourier transform of the filtered tachometer signal; and
   reconstructing, from the transformed, filtered tachometer signal, a reconstructed tachometer signal that includes less jitter than the received tachometer signal.

13. The method of reducing jitter in a tachometer signal according to claim 12 further including a step of taking a pseudo derivative of the tachometer signal, wherein the resulting pseudo derivative has a length n.

14. The method of reducing jitter in a tachometer signal according to claim 13 further including a step of determining a closest larger radix-2 value to n.

15. The method of reducing jitter in a tachometer signal according to claim 14 further including a step of creating an array of values of the resulting pseudo derivative values and zeros from n to the radix-2 value.

16. The method of reducing jitter in a tachometer signal according to claim 15 further including a step of calculating a bandwidth index.

17. The method of reducing jitter in a tachometer signal according to claim 16 further including a step of taking a fast Fourier transform of the array.

18. The method of reducing jitter in a tachometer signal according to claim 17 further including a step of setting real and imaginary parts of the transformed array from the bandwidth index to the radix-2 value.

19. The method of reducing jitter in a tachometer signal according to claim 18 further including a step of taking an inverse fast Fourier transform of the transformed array.

20. The method of reducing jitter in a tachometer signal according to claim 19 further including a step of taking a pseudo integral of the inverse transformed array.

* * * * *